US008346437B2

(12) United States Patent
Hayakawa et al.

(10) Patent No.: US 8,346,437 B2
(45) Date of Patent: Jan. 1, 2013

(54) VEHICLE DRIVING SUPPORT DEVICE AND VEHICLE DRIVING SUPPORT METHOD

(75) Inventors: Yasuhisa Hayakawa, Yokohama (JP); Kou Sato, Atsugi (JP); Masahiro Kobayashi, Ebina (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 0 days.

(21) Appl. No.: 13/387,450

(22) PCT Filed: Jul. 29, 2010

(86) PCT No.: PCT/JP2010/062797
§ 371 (c)(1),
(2), (4) Date: Jan. 27, 2012

(87) PCT Pub. No.: WO2011/013750
PCT Pub. Date: Feb. 3, 2011

(65) Prior Publication Data
US 2012/0130595 A1 May 24, 2012

(30) Foreign Application Priority Data

Jul. 30, 2009 (JP) ................................ 2009-177422
Jun. 11, 2010 (JP) ................................ 2010-133851

(51) Int. Cl.
*B62D 12/00* (2006.01)

(52) U.S. Cl. ............... 701/42; 701/23; 701/24; 701/28; 701/96; 701/117; 340/10.33; 340/435; 340/436; 340/988; 340/903; 342/24; 342/44; 342/50; 342/51; 342/70; 180/167; 180/168; 180/169; 455/517; 318/587

(58) Field of Classification Search ................ 701/23, 701/24, 28, 42, 96, 117, 300, 301, 431, 495, 701/532; 340/10.33, 435, 436, 988, 903, 340/905, 928, 933, 937, 995.25, 990; 342/42, 342/44, 50, 51, 70; 180/167, 168, 169; 455/517; 359/877, 843; 235/384; 404/10; 318/587; 348/118

See application file for complete search history.

(56) References Cited

U.S. PATENT DOCUMENTS

| 6,778,890 B2* | 8/2004 | Shimakage et al. ............ 701/41 |
| 7,496,446 B2* | 2/2009 | Maruyama et al. ........... 701/436 |
| 2005/0278113 A1* | 12/2005 | Maruyama et al. ........... 701/208 |

(Continued)

FOREIGN PATENT DOCUMENTS

JP     2000-33860 A     2/2000

(Continued)

*Primary Examiner* — Mary Cheung
*Assistant Examiner* — McDieunel Marc
(74) *Attorney, Agent, or Firm* — Foley & Lardner LLP

(57) ABSTRACT

When a lane-width-direction lateral position (X2obst+X0) of a vehicle (MM) reaches a predetermined control start position (60) being a lane-width-direction lateral position (X2obst+X0) serving as an approach prevention indicator for the vehicle (MM), a control start is determined and a yaw moment (Ms) toward the center of a vehicle traveling lane (200) is applied to the vehicle (MM) to control the vehicle (MM). Then, when the lane-width-direction lateral position (X2obst+X0) of the vehicle (MM) moves from the outside to the inside of the control start position (60), the determination of control start is suppressed for a predetermined period, compared to a period before the movement to the inside of the control start position (60).

11 Claims, 11 Drawing Sheets

U.S. PATENT DOCUMENTS

| | | | |
|---|---|---|---|
| 2008/0183419 A1* | 7/2008 | Cong et al. | 702/155 |
| 2009/0005933 A1 | 1/2009 | Tabata et al. | |
| 2010/0222965 A1* | 9/2010 | Kimura et al. | 701/41 |
| 2010/0318263 A1* | 12/2010 | Hayakawa et al. | 701/41 |
| 2011/0015850 A1* | 1/2011 | Tange et al. | 701/116 |
| 2011/0137487 A1* | 6/2011 | Nishimaki et al. | 701/1 |
| 2011/0293145 A1* | 12/2011 | Nogami et al. | 382/103 |
| 2012/0078484 A1* | 3/2012 | Kato | 701/96 |

FOREIGN PATENT DOCUMENTS

| | | |
|---|---|---|
| JP | 2000-289485 A | 10/2000 |
| JP | 2001-93097 A | 4/2001 |
| JP | 2001-344687 A | 12/2001 |
| JP | 2004-326355 A | 11/2004 |
| JP | 2004-355324 A | 12/2004 |
| JP | 2005-242482 A | 9/2005 |
| JP | 2009-6880 A | 1/2009 |

* cited by examiner

VEHICLE DRIVING SUPPORT DEVICE AND VEHICLE DRIVING SUPPORT METHOD

TECHNICAL FIELD

The present invention relates to a vehicle driving support device and a vehicle driving support method which supports the driving of a driver by controlling a vehicle so that the vehicle moves toward the center of a lane when a lateral position of the vehicle reaches a predetermined lateral position in a lane width direction.

BACKGROUND ART

A technique described in Patent Literature 1 is an example of a conventional vehicle driving support device. In this conventional technique, when a lane departure tendency of the vehicle is detected based on a lane dividing line and a future position of the vehicle after a predetermined time period, the vehicle is controlled to move in such a direction that the lane departure is prevented.

CITATION LIST

Patent Literature

Patent Literature 1: Japanese Patent Unexamined Publication No. 2000-33860

SUMMARY OF INVENTION

However, in a system which causes a departure avoidance control to intervene when the future position (future lateral position) or current lateral position of the vehicle exceeds a predetermined reference value, the control may intervene again even in the state where the vehicle is traveling in a direction to cancel the lane departure tendency.

In the case where the future vehicle position, in particular, is predicted, the predicted future vehicle position tends to be unstable due to the steering of the driver. Thus, when whether to make control intervention is determined based on the future vehicle position as in the technique described in aforementioned Patent Literature 1, a recontrol which gives feeling of strangeness is likely to be performed.

In this respect, an object of the invention is to provide a vehicle driving support device and a vehicle driving support method which are capable of appropriately performing a vehicle driving support control against a side obstacle while suppressing the feeling of the strangeness given to the driver.

To solve the problems described above, a vehicle driving support device of a first aspect of the invention is characterized by comprising: a control start determination part configured to determine to start a control when a lateral position of a vehicle in a lane width direction reaches a control start position being a predetermined lateral position in the lane width direction; a vehicle controller configured to control the vehicle by applying a yaw moment toward the center of a vehicle traveling lane to the vehicle when the control start determination part makes the determination of control start; and a control suppression part configure to, when the lateral position of the vehicle in the lane width direction moves from a position outside the control start position in the lane width direction to a position approaching the vehicle traveling lane inside the control start position in the lane width direction, suppress the control of applying the yaw moment to the vehicle for a predetermined period after the lateral position of the vehicle in the lane width direction moves to the position approaching the vehicle traveling lane, compared to a period before the movement to the position approaching the vehicle traveling lane.

Furthermore, a vehicle driving support method of a second aspect of the invention is characterized by comprising: a control start determination step of determining to start a control when a lateral position of a vehicle in a lane width direction reaches a control start position being a predetermined lateral position in the lane width direction; a vehicle control step of controlling the vehicle by applying a yaw moment toward the center of a vehicle traveling lane to the vehicle; and a control suppression step of, when the lateral position of the vehicle in the lane width direction moves from a position outside the control start position in the lane width direction to a position approaching the vehicle traveling lane inside the control start position in the lane width direction, suppressing the control of applying the yaw moment to the vehicle for a predetermined period after the lateral position of the vehicle in the lane width direction moves to the position approaching the vehicle traveling lane, compared to a period before the movement to the position approaching the vehicle traveling lane.

In the invention, when the lateral position of the vehicle in the lane width direction moves to a position inside the control start position after the control start is determined, the control is suppressed for the predetermined period after the movement to the position on the inside. Thus, even when the lateral position of the vehicle in the lane width direction is unstable, the control can be suppressed. As a result, a feeling of strangeness given to a driver can be reduced.

DESCRIPTION OF EMBODIMENTS

Embodiments of the invention are described below based on the drawings.

The embodiments are described for cases where a vehicle driving support device is installed in a rear-wheel drive vehicle. Note that, a vehicle in which the vehicle driving support device is installed may be a front-wheel drive vehicle or a four-wheel drive vehicle.

First Embodiment (Configuration)

Figure 1:
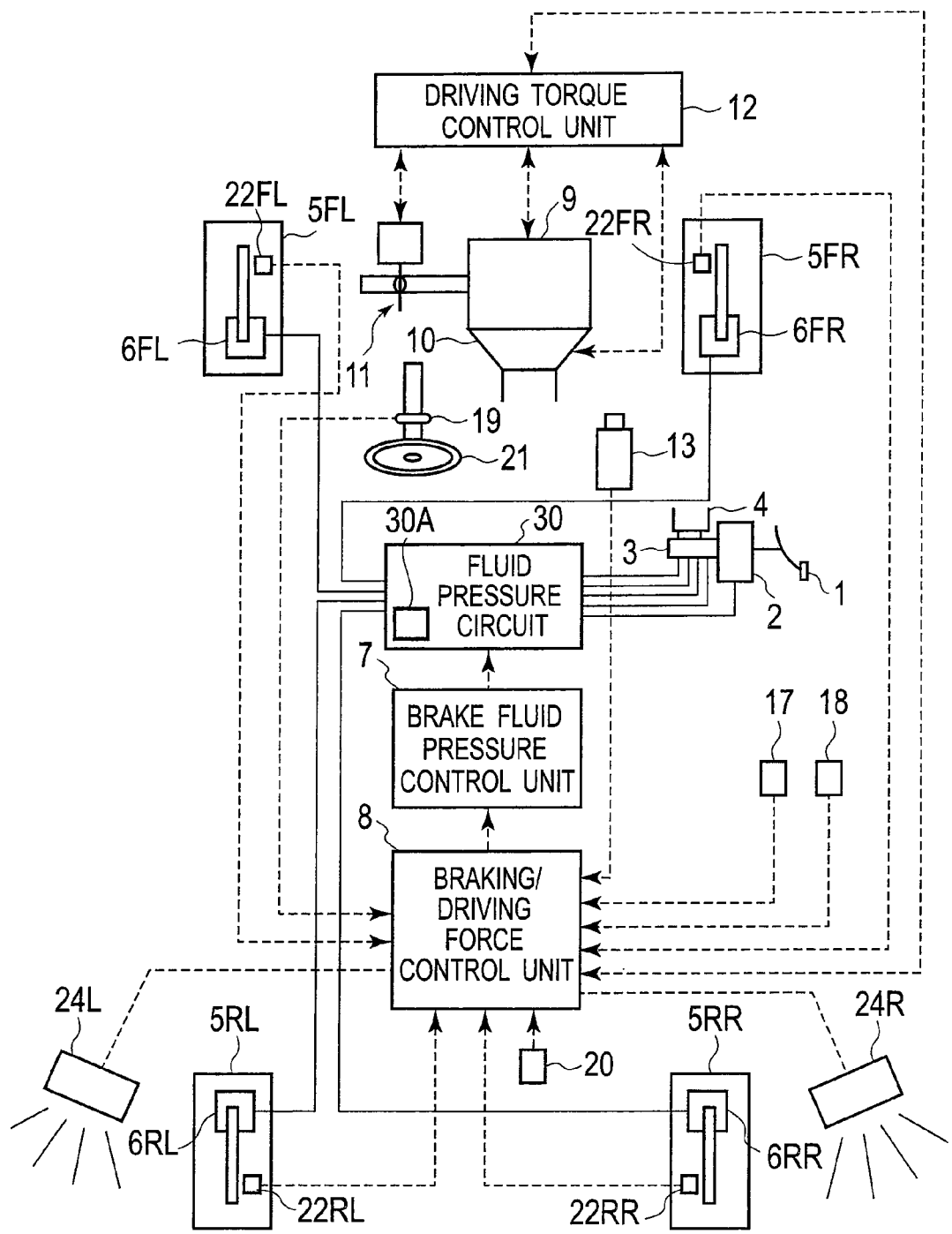
FIG. 1 is a schematic configuration diagram of a vehicle driving support device of embodiments based on the invention.

FIG. 1 is a schematic configuration diagram of a device of a first embodiment.

Reference numeral 1 in the drawing is a brake pedal. The brake pedal 1 is connected to a master cylinder 3 via a booster 2. Moreover, reference numeral 4 in the drawing is a reservoir.

The master cylinder 3 is connected to wheel cylinders 6FL, 6FR, 6RF, 6RR of the respective wheels via a fluid pressure circuit 30. Thus, in a state where a braking control is not operated, the master cylinder 3 increases a brake fluid pressure in accordance with an amount by which a driver steps on the brake pedal. The increased brake fluid pressure is supplied to the wheel cylinders 6FL, 6FR, 6RF, 6RR of respective wheels 5FL, 5FR, 5RF, 5RR via the fluid pressure circuit 30.

A brake fluid pressure control unit 7 controls an actuator 30A in the fluid pressure circuit 30, and controls brake fluid pressures to the respective wheels 5FL, 5FR, 5RF, 5RR, individually. Moreover, the brake fluid pressure control unit 7 controls the brake fluid pressures to the respective wheels 5FL, 5FR, 5RF, 5RR in such a way that values of the brake fluid pressures correspond to command values sent from a braking/driving force control unit 8. A proportional solenoid valve which can control hydraulic pressures of the respective wheel cylinders 6FL, 6FR, 6RF, 6RR to be desired brake hydraulic pressures may be used as the actuator 30A.

Here, for example, a brake fluid pressure control unit used in an anti-skid control (ABS), traction control (TCS), or vehicle dynamics control (VDC) system can be utilized as the brake fluid pressure control unit 7 and the fluid pressure circuit 30. The brake fluid pressure control unit 7 may be configured to control the brake fluid pressures of the respective wheel cylinders 6FL, 6FR, 6RF, 6RR, only by itself, i.e. without the fluid pressure circuit 30. When the brake fluid pressure control unit 7 receives the brake fluid pressure command values from the braking/driving force control unit 8 to be described later, the brake fluid pressure control unit 7 controls the brake fluid pressures in accordance with the brake fluid pressure command values.

Moreover, the vehicle is provided with a driving torque control unit 12.

The driving torque control unit 12 controls driving torques of the respective rear wheels 5RL, 5RR being drive wheels. This control is achieved by controlling a driving state of an engine 9, a gear ratio selection of an automatic transmission 10, and a throttle opening degree of a throttle valve 11. In other words, the driving torque control unit 12 controls a fuel injection amount and ignition timing. Furthermore, the throttle opening degree is controlled at the same time. Thus, the driving state of the engine 9 is controlled.

Moreover, the driving torque control unit 12 outputs values of driving torques Tw being information used in the control to the braking/driving force control unit 8.

Note that, the driving torque control unit 12 can control the driving torques Tw of the respective rear wheels 5RL, 5RR, only by itself, i.e. without the braking/driving force control unit 8. However, when the driving torque control unit 12 receives the driving torque command values from the braking/driving force control unit 8, the driving torque control unit 12 controls the drive torques Tw in accordance with the received driving torque command values.

Furthermore, an image capturing unit 13 with an image processing function is provided in a front portion of the vehicle. The image capturing unit 13 is used to detect the position of a vehicle MM in a traveling lane (see FIG. 4). The image capturing unit 13 includes, a monocular camera formed of, for example, a CCD (Charge Coupled Device) camera.

The image capturing unit 13 captures a forward image of the vehicle MM. Then, the image capturing unit 13 performs image processing on the captured forward image of the vehicle MM, detects a lane dividing line such as a white line 200 (lane marker) (see FIG. 4), and detects the traveling lane on the basis of the detected white line 200. Thereafter, the image capturing unit 13 detects the traveling lane width of a vehicle traveling lane. Moreover, the image capturing unit 13 determines a white line recognition certainty to be described later.

Moreover, the image capturing unit 13 calculates an angle (yaw angle) φ front between the traveling lane of the vehicle MM and the front-rear direction axis of the vehicle MM, a lateral displacement $X_{front}$ with respect to the traveling lane, a traveling lane curvature $\beta_{front}$, and the like on the basis of the detected traveling lane. The image capturing unit 13 outputs the calculated yaw angle $\phi_{front}$, lateral displacement $X_{front}$, traveling lane curvature $\beta_{front}$, and the like to the braking/driving force control unit 8.

The image capturing unit 13 detects the white line 200 forming the traveling lane, and calculates the yaw angle $\phi_{front}$ on the basis of the detected white line 200. Thus, the detection accuracy of the yaw angle $\phi_{front}$ is affected by the detection accuracy of the white line 200 of the image capturing unit 13.

Note that, the traveling lane curvature $\beta_{front}$ may be calculated based on a steering angle δ of a steering wheel 21 to be described later.

Moreover, the vehicle includes radar devices 24L/24R. The radar devices 24L/24R are each a sensor for detecting a side obstacle SM (see FIG. 4) on the right or the left of the vehicle MM. Each of the radar devices 24L/24R is, for example, a milliwave radar capable of detecting existence of the obstacle SM in a predetermined blind area at least to the sides and rear (sideward and rearward) of the vehicle by emitting an electromagnetic wave to an obstacle detection area K-AREA being the predetermined blind area and by detecting a reflected wave of the emitted electromagnetic wave. Hereafter, the radar devices 24L/24R are also simplify referred to as the milliwave radars. It is assumed that the radar devices 24L/24R are capable of detecting a relative lateral position POSXobst, a relative longitudinal position DISTobst, and a relative longitudinal speed dDISTobst, which are relative to the obstacle SM, in each of the left and right sides. Moreover, the radar devices 24L/24R determine an obstacle recognition certainty to be described later.

Note that, the lateral direction in the embodiments of the description refers to a width direction of the lane, and the longitudinal direction refers to an extending direction of the lane.

In addition, the vehicle includes a master cylinder pressure sensor 17, an accelerator opening degree sensor 18, a steering angle sensor 19, an indicator switch 20, and wheel speed sensors 22FL, 22FR, 22RL, 22RR.

The master cylinder pressure sensor 17 detects an output pressure of the master cylinder 3, i.e. a master cylinder hydraulic pressure Pm. The accelerator opening degree sensor 18 detects the amount by which the accelerator pedal is stepped on, i.e. an accelerator opening degree θt. The steering angle sensor 19 detects the steering angle δ of the steering wheel 21. The indicator switch 20 detects an indicator operation of an indicator. The wheel speed sensors 22FL, 22FR, 22RL, 22RR detect rotation speeds of the respective wheels 5FL, 5FR, 5RF, 5RR, or so-called wheel speeds Vwi (i=fl, fr, rl, rr), respectively. These sensors and the like output the detected detection signals to the braking/driving force control unit 8.

Figure 2:
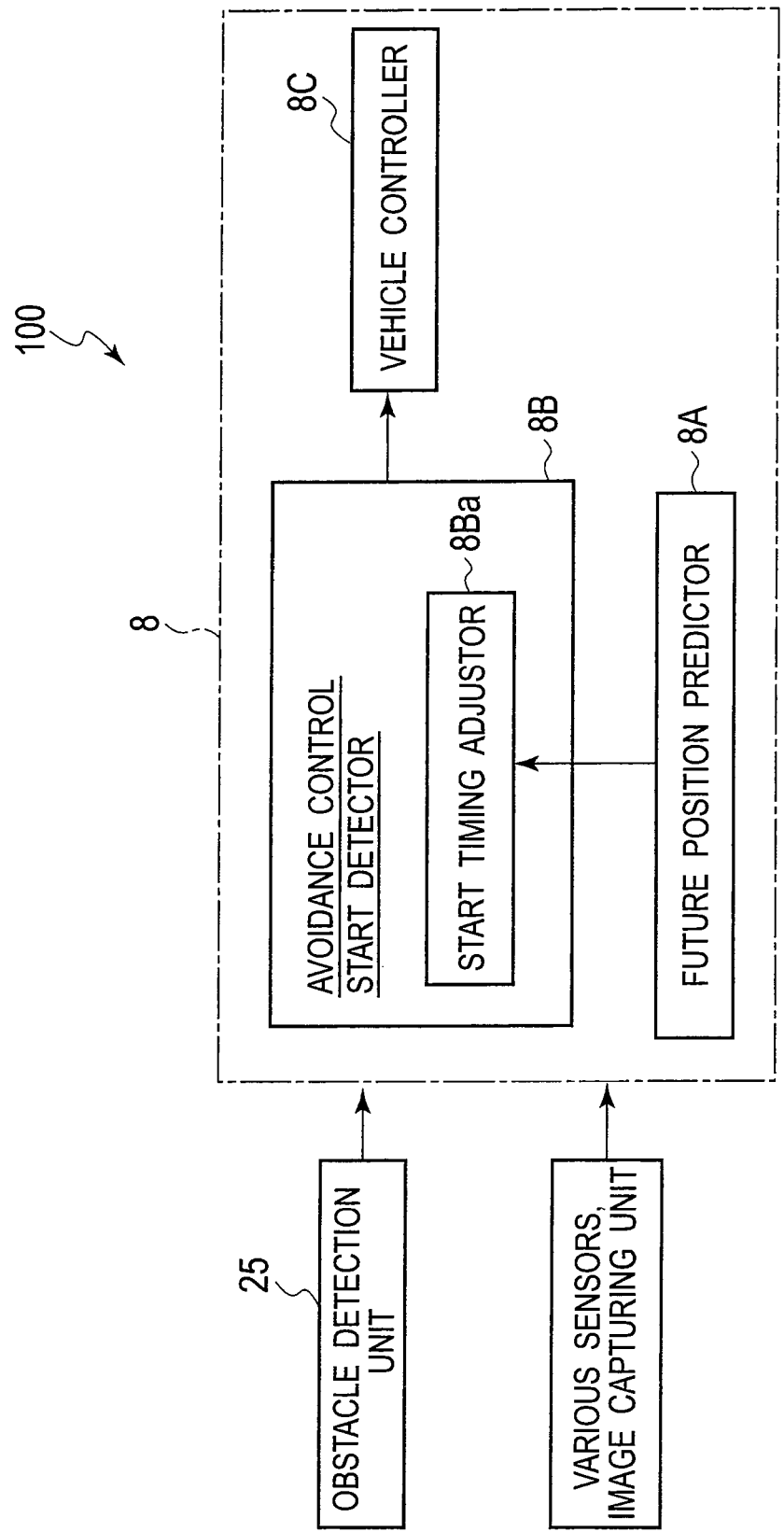
FIG. 2 is a block diagram schematically showing processing of a braking/driving force control unit.

FIG. 2 is a block diagram schematically showing processing of the braking/driving force control unit 8. The processing of the braking/driving force control unit 8 is performed based on a flowchart (FIG. 3) to be described later. In FIG. 2, the processing is schematically described as blocks.

As shown in FIG. 2, the braking/driving force control unit 8 includes a future position predictor 8A, an avoidance control start detector (control start determination part) 8B, and a vehicle controller 8C. The avoidance control start detector 8B includes a start timing adjustor (control suppression part) 8Ba.

The future position predictor 8A predicts a future vehicle position (a future position of the vehicle in the traveling-lane width direction) after a forward observation time period Tt being a preset setting time period, on the basis of a steering input of the driver, the state of the vehicle MM, and the like detected by the sensors and the image capturing unit 13. Note that, a method of predicting the future vehicle position is described later.

The avoidance control start detector 8B detects a control start when the future vehicle position reaches a predetermined control start position 60 (a predetermined lateral position in the lane width direction, see FIG. 4 to be described later) in a case where it is judged that an obstacle detection unit 25 is detecting the obstacle SM on either side of the vehicle.

Furthermore, when a future vehicle position 150 moves from a position outside the control start position 60 in the lane width direction to a position approaching the traveling lane inside the control start position 60 in the lane width direction, the start timing adjustor 8Ba suppresses (reduces the frequency of the determination of control start or reduces a control amount) the control (the determination of control start and the control amount) until a control state hold time period as a predetermined time period elapses after the future vehicle position moves to the position approaching the vehicle traveling lane, compared to a period before the movement to the position approaching the vehicle traveling lane.

When the avoidance control start detector 8B detects the control start, the vehicle controller 8C calculate a yaw moment Ms used to control the vehicle MM in such a way that the vehicle MM is prevented from approaching the obstacle SM. The yaw moment Ms is such a yaw moment that is used to control the vehicle MM toward the center of the lane.

Note that, the obstacle detection unit 25 of FIG. 2 corresponds to the radar devices 24L/24R, and detects information on the obstacle SM in which the vehicle MM is used as a reference. The information includes the existence of the obstacle SM in the obstacle detection area K-AREA to the sides and rear of the vehicle, as well as the relative lateral position POSXobst, the relative longitudinal position DISTobst, a relative longitudinal speed dDISTobst, and the like of the obstacle SM with respect to the vehicle MM.

Figure 3:
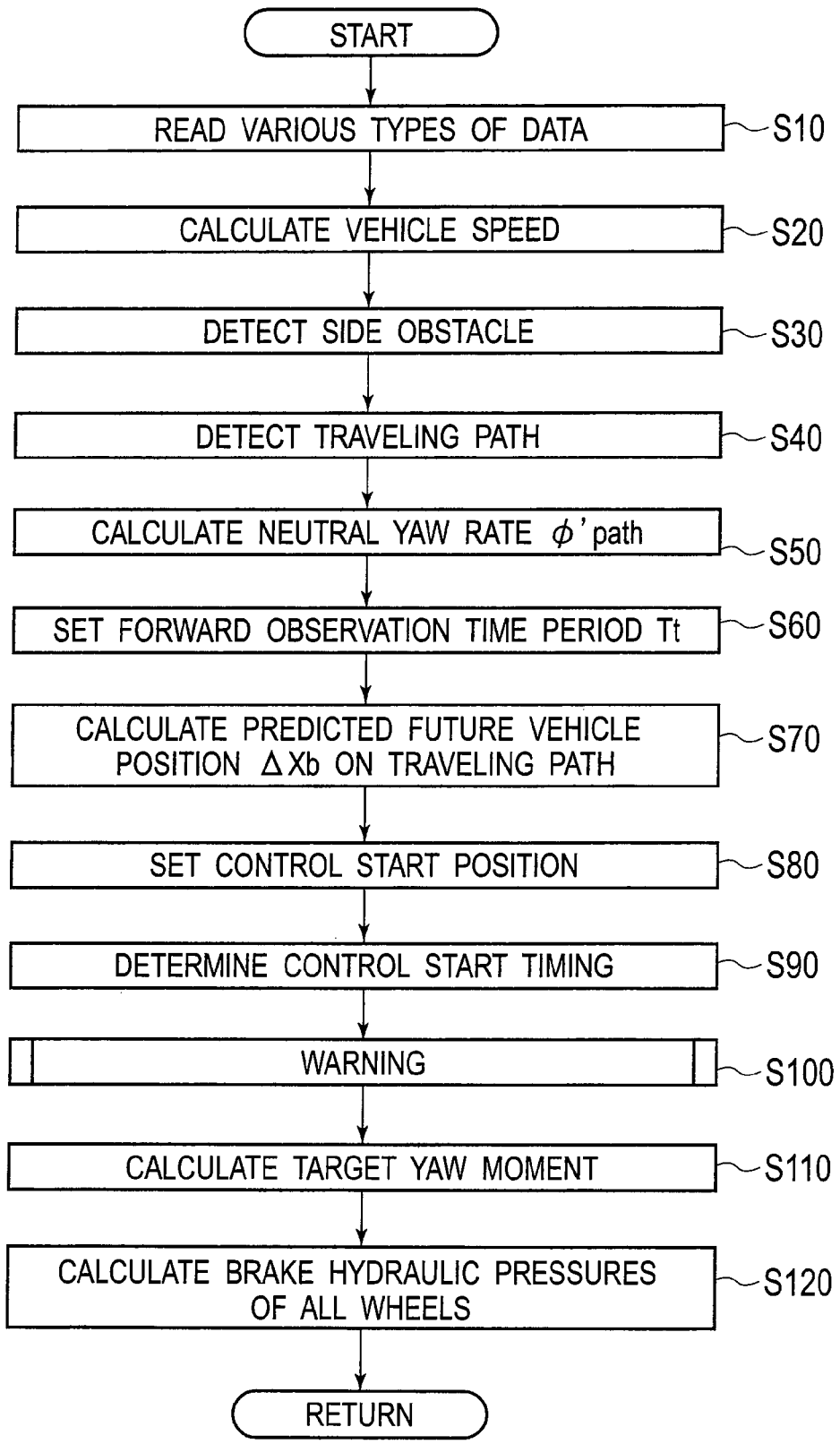
FIG. 3 is a flowchart showing a processing procedure of the braking/driving force control unit in a first embodiment.

FIG. 3 is a flowchart showing a procedure of an obstacle avoidance control processing executed by the braking/driving force control unit 8.

The obstacle avoidance control processing is executed by performing timer interruption every predetermined sampling time period (control cycle) ΔT (for example, every 10 msec). Note that, the process shown in FIG. 3 includes no communication process. However, information acquired from a calculation process is updated and stored in a storage device as necessary, and necessary information is read from the storage device as necessary.

<Step S10>

First, in step S10, the braking/driving force control unit 8 reads various types of data from the sensors, controller, and control units described above. Specifically, the braking/driving force control unit 8 acquires the wheel speeds Vwi (i=fl, fr, rl, rr), the steering angle δ, the accelerator opening degree θt, and the master cylinder hydraulic pressure Pm detected respectively by the wheel speed sensors 22FL, 22FR, 22RL, 22RR, the steering angle sensor 19, the accelerator opening degree sensor 18, and the master cylinder pressure sensor 17. In addition, the braking/driving force control unit 8 acquires the indicator switch signal of the indicator switch 20, the yaw angle $\phi_{front}$, the lateral displacement $X_{front}$, and the traveling lane curvature $\beta_{front}$ detected by the image capturing unit 13, and the information on the side obstacle SM detected by the radar devices 24L/24R (obstacle detection unit 25).

<Step S20>

Next, in Step S20, the braking/driving force control unit 8 calculates a vehicle speed V. Specifically, the vehicle speed V is calculated from the following formulae on the basis of the wheel speeds Vwi detected by the wheel speed sensors 22FL, 22FR, 22RL, 22RR.

$$V=(Vwrl+Vwrr)/2 \text{ (:in the case of front wheel drive),}$$

$$V=(Vwfl+Vwfr)/2 \text{ (:in the case of rear wheel drive)} \quad (1)$$

where Vwfl, Vwfr are respectively the wheel speeds of the left and right front wheels, and Vwrl, Vwrr are respectively the wheel speeds of the left and right rear wheels. In other words, in aforementioned formula (1), the vehicle speed V is calculated as an average value of the wheel speeds of the non-driving wheels. Note that, since the vehicle in the first embodiment is a rear wheel drive vehicle, the vehicle speed V is calculated by using the latter formula, i.e. the wheel speeds Vwfl, Vwfr of the left and right front wheels 5FL, 5FR.

Moreover, when a different automatic braking control device such as an ABS (Anti-lock Brake system) control is operating, an estimated vehicle speed estimated by the different braking control device is acquired, and is used as the vehicle speed V.

<Step S30>

In step S30, the braking/driving force control unit 8 acquires existences Lobst·Robst of the obstacle SM in the areas to the left and right of the vehicle MM, on the basis of the signals from the radar devices 24L/24R respectively on the left and right side. Moreover, the braking/driving force control unit 8 acquires the position and speed of the side obstacle SM relative to the vehicle MM. Here, as shown in FIG. 4, the areas to the side of the vehicle MM include areas obliquely rearward of the vehicle MM.

Figure 4:
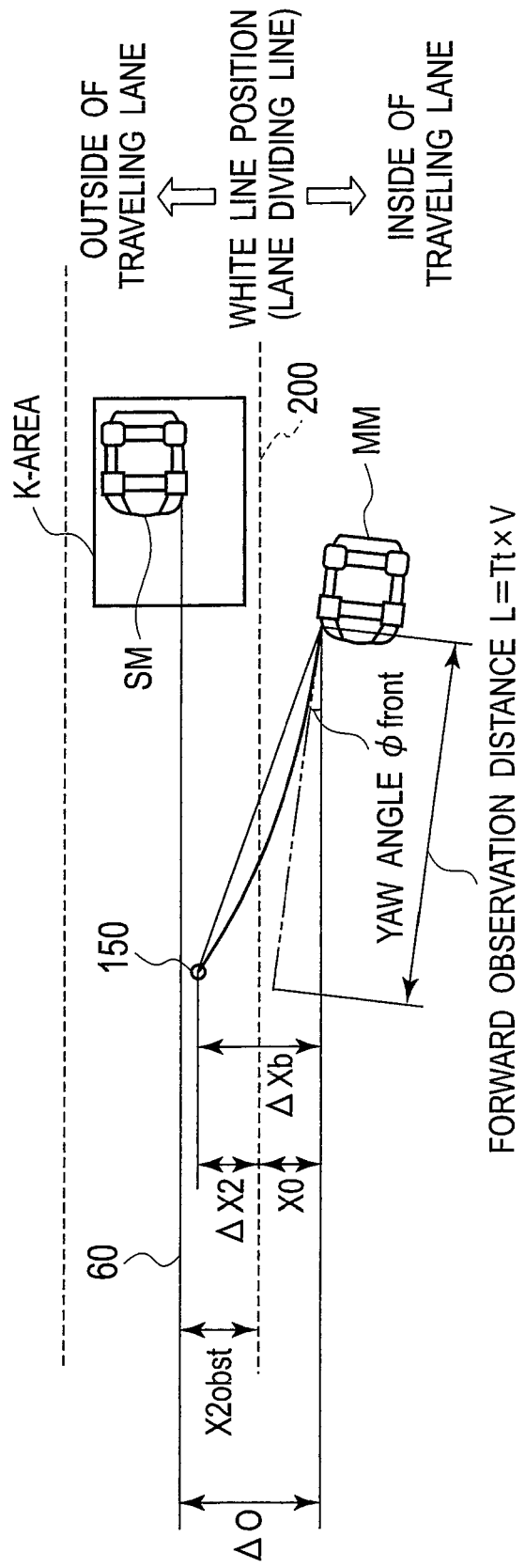
FIG. 4 is a schematic view showing a relationship between a vehicle and an obstacle.

The obstacle detection area K-AREA shown in FIG. 4 is set at predetermined longitudinal and lateral positions in the area to the side of the vehicle MM. Moreover, the longitudinal position may be set such that the higher the speed of the obstacle SM relative to the vehicle MM is, the larger the obstacle detection area K-AREA is.

<Step S40>

Next, in step S40, the braking/driving force control unit 8 reads the lateral displacement (lateral position) $X_{front}$ of the vehicle MM in a traveling road on which the vehicle MM is currently traveling and the traveling lane curvature $\beta_{front}$, from the image capturing unit 13.

Note that, the traveling lane curvature $\beta_{front}$ may not only be acquired from a calculation based on the image captured by the image capturing unit 13, but also in the following way. For example, traveling lane curvature information at a position of the vehicle may be acquired based on map information stored in a navigation system.

In addition, the yaw angle $\phi_{front}$ of the vehicle MM with respect to the traveling road on which the vehicle MM is currently traveling is calculated. The yaw angle $\phi_{front}$ is used to detect a traveling state in the lane.

In the first embodiment, the yaw angle $\phi_{front}$ is detected by, for example, converting the vehicle forward image captured by the image capturing unit 13 into a bird's-eye-view image and using an angle of the white line 200 (lane marker) with respect to an up-down direction of the converted image.

Note that, the yaw angle $\phi_{front}$ can be calculated based on the white line 200 near the vehicle MM in the image captured by the image capturing unit 13. In this case, the yaw angle $\phi_{front}$ is calculated from formula (2) described below by using, for example, a change amount of the lateral displacement $X_{front}$ of the vehicle MM.

$$\phi_{front} = \tan^{-1}(dX'/V(=dX/dY)) \quad (2)$$

where dX is a change amount of the lateral displacement $X_{front}$ per unit time, dY is a change amount in the traveling direction per unit time, and dX' is a derivative of the change amount dX.

Note that, in the case of calculating the yaw angle $\phi_{front}$ on the basis of the nearby white line 200, the calculation is not limited to one in which the yaw angle $\phi_{front}$ is calculated using the lateral displacement $X_{front}$ as in aforementioned formula (2). For example, the calculation may be made as follows. The white line 200 detected nearby is extended to a distant position, and the yaw angle $\phi_{front}$ is calculated based on the extended white line 200. These methods of calculating the lateral displacement $X_{front}$, traveling lane curvature $\beta_{front}$, the yaw angle $\phi_{front}$, and the like of the vehicle MM on the basis of the vehicle forward image are publicly known technique already used in various devices which controls the vehicle MM by recognizing the white line 200, such as a lane-keeping travel control device, and thus are not described in detail.

<Step S50>

In step S50, the braking/driving force control unit 8 calculates a neutral yaw rate $\phi'_{path}$ on the basis of formula (3) described below. The neutral yaw rate $\phi'_{path}$ is a yaw rate required to cause the vehicle MM to keep on traveling along the traveling road. When the vehicle MM is traveling on a straight road, the neutral yaw rate $\phi'_{path}$ is zero. However, the neutral yaw rate $\phi'_{path}$ changes in a curved road due to the curvature $\beta_{front}$ of the curved road. Thus, the traveling lane curvature $\beta_{front}$ describe above is used to calculate the neutral yaw rate $\phi'_{path}$.

$$\phi'_{path} = \beta_{front} \cdot V \quad (3)$$

Here, the neutral yaw rate $\phi'_{path}$ required for the vehicle MM to keep on traveling along a traveling path may be calculated in a simplified manner by using an average value $\phi'$ave of the neutral yaw rate $\phi'_{path}$ in a predetermined period or a value obtained by multiplying the neutral yaw rate $\phi'_{path}$ by a filter with a large time constant.

<Step S60>

In step S60, the braking/driving force control unit 8 sets the forward observation time period Tt. Specifically, a predetermined forward observation time period Tt0 is set as the forward observation time period Tt as in the following formula.

$$Tt \leftarrow Tt0$$

The forward observation time period Tt0 is a time used to predict a situation where the driver causes the vehicle MM to approach the obstacle SM in the future. For example, the forward observation time period Tt0 is set to one second.

Next, a target yaw rate $\Psi_{driver}$ and a corrected target yaw rate $\Psi_{drivercorrection}$ are calculated.

The target yaw rate $\Psi_{driver}$ is calculated from the steering angle $\delta$ and the vehicle speed V as shown in the formula described below. The target yaw rate $\Psi_{driver}$ is a yaw rate which the driver tries to generate by performing a steering operation. In other words, the target yaw rate $\Psi_{driver}$ is a yaw rate which the driver tries to generate deliberately.

$$\Psi_{driver} = Kv \cdot \delta \cdot V \quad (4)$$

where Kv is a gain preset in accordance with the specifications of the vehicle and the like.

Furthermore, the corrected target yaw rate $\Psi_{drivercorrection}$ is calculated from the formula described below. The corrected target yaw rate $\Psi_{drivercorrection}$ is a value obtained by subtracting the neutral yaw rate $\phi'_{path}$ required for the vehicle MM to keep on traveling along the traveling road from the target yaw rate $\Psi_{driver}$. Thus, an effect of steering performed to cause the vehicle MM to travel on the curved road is removed from the target yaw rate $\Psi_{driver}$.

$$\Psi_{drivercorrection} = \Psi_{driver} - \phi'_{path} \quad (5)$$

In other words, the corrected target yaw rate $\Psi_{drivercorrection}$ is a deviation between the yaw rate (neutral yaw rate $\phi'_{path}$) required for the vehicle MM to keep on traveling along the traveling lane and the yaw rate (target yaw rate $\Psi_{driver}$) which the driver tries to generate by performing the steering operation, and is a yaw rate corresponding to the driver's intention of changing the lane.

<Step S70>

Next, in step S70, the braking/driving force control unit 8 calculates a predicted vehicle position $\Delta Xb$ on the basis of formula (6) described below, the predicted vehicle position $\Delta Xb$ being a distance from a current lateral position (position in the traveling-road width direction) of the vehicle MM to a lateral position of the vehicle MM after the forward observation time period Tt. In other words, the lateral distance (distance in the traveling-road width direction) from the current lateral position of the vehicle MM to the position of the vehicle MM after the forward observation time period Tt (future vehicle position 150) is calculated as the predicted vehicle position $\Delta Xb$. Here, the forward observation time period Tt is a value set as appropriate, and is a design value. Note that, the predicted vehicle position $\Delta Xb$ is used in the determination as to whether to start the avoidance control against the obstacle SM.

$$\Delta Xb = (K1\phi_{front} + K2\phi m + K3\phi m') \quad (6)$$

where $\phi_{front}$: Yaw angle $\phi m$: Target yaw angular velocity $\phi m'$: Target yaw angular acceleration.

The aforementioned target yaw angular velocity $\phi m$ is expressed by the following formula.

$$\phi m = \Psi_{drivercorrection} \cdot Tt \quad (7)$$

Moreover, the target yaw angular acceleration $\phi m'$ is expressed by the following formula.

$$\phi m' = \phi m \cdot Tt^2 \quad (8)$$

Here, when a forward observation distance L is used to make the predicted vehicle position ΔXb a dimension of the yaw angle, the predicted vehicle position ΔXb can be expressed by the following formula.

$$\Delta Xb = L \cdot (K1\phi_{front} + K2\phi m \cdot Tt + K3\phi m' \cdot Tt^2) \quad (9)$$

Here, a relationship between the forward observation distance L and the forward observation time period Tt is expressed by the following formula.

Forward observation distance $L$=forward observation time period $Tt$·vehicle speed $V$ (10)

In view of these characteristics, a setting gain K1 is a value using the vehicle speed V as a function. Furthermore, a setting gain K2 is a value using the vehicle speed V and the forward observation time period Tt as functions. A setting gain K3 is a value using the vehicle speed V and the square of the forward observation time period Tt as functions.

Note that, the predicted position of the vehicle MM may be calculated by obtaining a steering angle component and a steering speed component individually and then performing select-high, as in the following formula.

$$\Delta Xb = \max(K2\phi m, K3\int \phi m') \quad (11)$$

<Step S80>

Next, in step S80, the braking/driving force control unit 8 sets a determination threshold used to determine whether to start the control or not. This determination threshold is a determination threshold used to determine whether to start the avoidance control against the side obstacle SM, and corresponds to the control start position 60 described above.

In the first embodiment, the determination threshold is set based on an obstacle distance X2obst being a predetermined distance shown in FIG. 4. The obstacle distance X2obst corresponds to a distance from a virtual predetermined position (position in the lane width direction) where the obstacle SM exists to the white line 200 in the lateral direction.

Here, an X-Y coordinate system is used in which a Y axis extends in a direction parallel to the traveling road (longitudinal direction) and an X axis extends in a direction orthogonal to the traveling road, i.e. a lane width direction (lateral direction). Then, the obstacle distance X2obst is set on the X-axis coordinate. Note that, the obstacle distance X2obst is zero when the virtual predetermined position where the obstacle exists is at a position on the white line 200, is a positive value when the virtual predetermined position is outside the white line 200, and is a negative value when the virtual predetermined position is on the inside of white line 200.

As described above, a value obtained by adding the predetermined obstacle distance X2obst to a lateral displacement X0 of the vehicle MM in FIG. 4 (i.e. X2obst+X0) is used as a virtual distance from the vehicle MM to the obstacle SM, and thus the determination threshold is set. Note that, X0 is a lateral-direction distance (distance in the lane width direction) between the vehicle MM and the white line 200 as in the illustration of FIG. 4. The lateral displacement X0 is acquired, for example, by processing an image captured by the image capturing unit 13. The lateral-direction distance (lateral displacement X0) between the vehicle MM and the white line 200 is a positive value when the vehicle MM is inside the white line 200, and is a negative value when the vehicle MM is at a position beyond the white line 200. Note that, the lateral displacement X0 of the vehicle MM is obtained by using the lateral displacement $X_{front}$ detected by the image capturing unit 13.

Next, a method of setting the obstacle distance X2obst is described.

Figure 5:
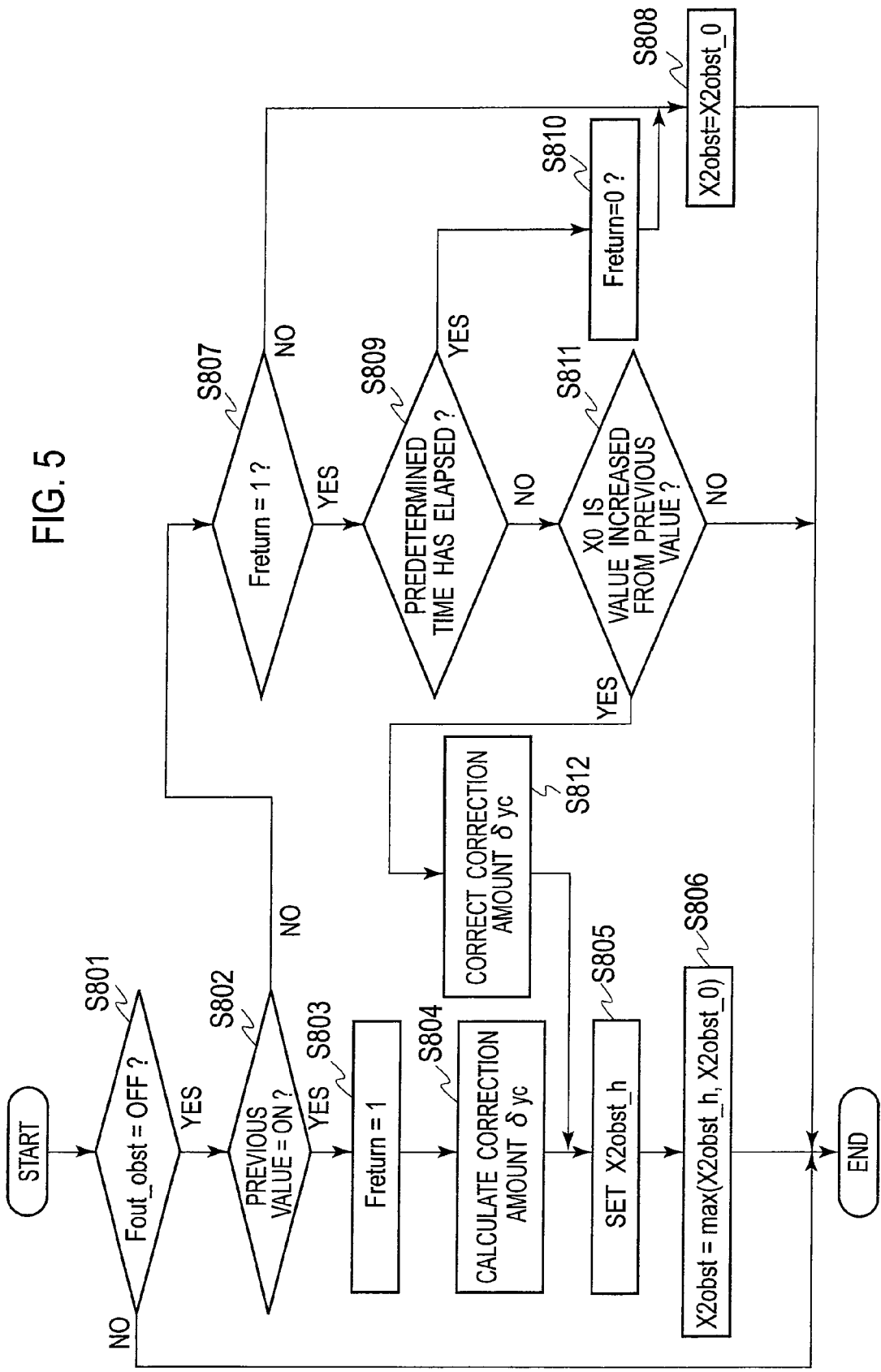
FIG. 5 is a flowchart showing a first example of a control start position setting processing procedure.

FIG. 5 is a flowchart showing a first example of a control start position setting processing procedure executed in step S80.

<Step S801>

First, in step S801, the braking/driving force control unit 8 judges whether an obstacle avoidance control determination flag Fout_obst to be described later is OFF or not. When Fout_obst=OFF, the control start position setting processing proceeds to step S802. When the Fout_obst=ON, the control start position setting processing is immediately completed.

Note that, although described later in detail, the obstacle avoidance control determination flag Fout_obst is basically a flag which is turned ON when the predicted vehicle position ΔXb described above reaches or exceeds X2obst+X0. In other words, the obstacle avoidance control determination flag Fout_obst is a flag which is set to ON when the lateral position of the vehicle after the forward observation time period Tt coincides with a position of the obstacle distance X2obst from the white line 200 or is at a position farther from the lane than the position of the obstacle distance X2obst.

<Step S802>

In step S802, the braking/driving force control unit 8 judges whether a previous value of the obstacle avoidance control determination flag Fout_obst is ON or not. When Fout_obst (previous value)=ON, the processing proceeds to step S803. When Fout_obst (previous value)=OFF, the processing proceeds to step S807 to be described later.

<Step 803>

In step S803, the braking/driving force control unit 8 sets a return flag Freturn to "1", and the processing proceeds to step S804. The return flag Freturn is a flag which is set to "1" when it is judged in step S801 that the current obstacle avoidance control determination flag Fout_obst=OFF and it is judged in step S802 that the previous obstacle avoidance control determination flag Fout_obst=ON. In other words, the return flag Freturn is a flag indicating whether the predicted vehicle position ΔXb has become (has returned to) ΔXb<X2obst+X0 after reaching or exceeding the determination threshold X2obst+X0 (obstacle distance X2obst+lateral displacement X0).

<Step S804>

In step S804, the braking/driving force control unit 8 sets a correction amount δyc used to set a corrected obstacle distance X2obst_h to be described later. Here, the correction amount δyc may be a fixed value or may be set while referring to a predetermined correction amount calculation map as described later.

Figure 6:
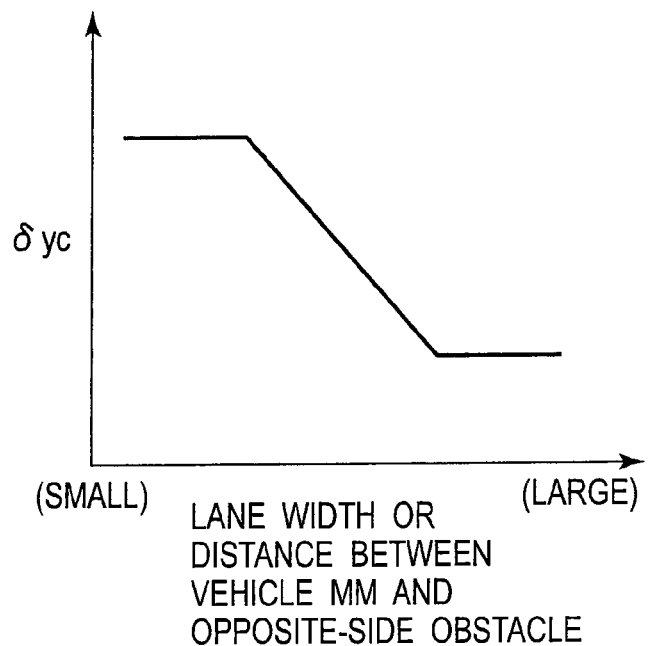
FIG. 6 is a first example of a correction amount calculation map.

As shown in FIG. 6 (a first example of the correction amount calculation map), the correction calculation amount map has a vertical axis representing the correction amount δyc and a horizontal axis representing a lane width. Here, a lane width of the vehicle traveling lane may be simply used as the lane width, or a distance between the vehicle MM and a white line on the side opposite to the side in which the obstacle SM being the target of avoidance control exists may be used as the lane width. Moreover, the smaller the lane width is, the larger the correction amount δyc is set.

Note that, in FIG. 6, if there is an opposite-side obstacle (opposite-side obstacle existing on a side to which the vehicle MM is to laterally move by the obstacle avoidance control), the correction amount δyc may be set in accordance with a distance between the vehicle MM and the opposite-side obstacle instead of the lane width. In this case, the smaller the distance between the vehicle MM and the opposite-side obstacle is, the larger the correction amount δyc is set.

Figure 7:
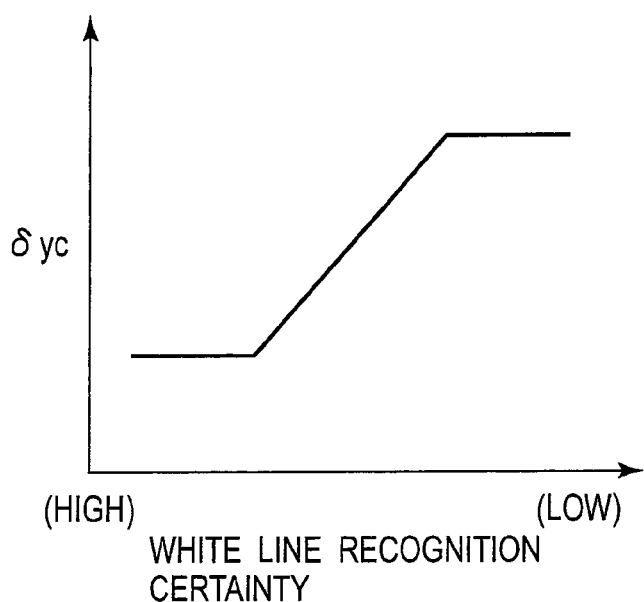
FIG. 7 is a second example of a correction amount calculation map.

Moreover, when the control start position 60 is set based on the position of the white line 200 (when the determination threshold is set based on X2obst), the correction amount δyc may be calculated based on a recognition state of the white line 200. In this case, as shown in FIG. 7 (a second example of the correction amount calculation map), a map is used which has a vertical axis representing the correction amount δyc and a horizontal axis representing the white line recognition certainty. The white line recognition certainty (recognition accuracy) is detected, for example, from an amount of a high frequency component of the white line 200. In this case, the larger the components of noise and deflection are, or the more the edge of the white line 200 is blurred (the lower the white line recognition certainty is), the larger the correction amount δyc is set.

Figure 8:
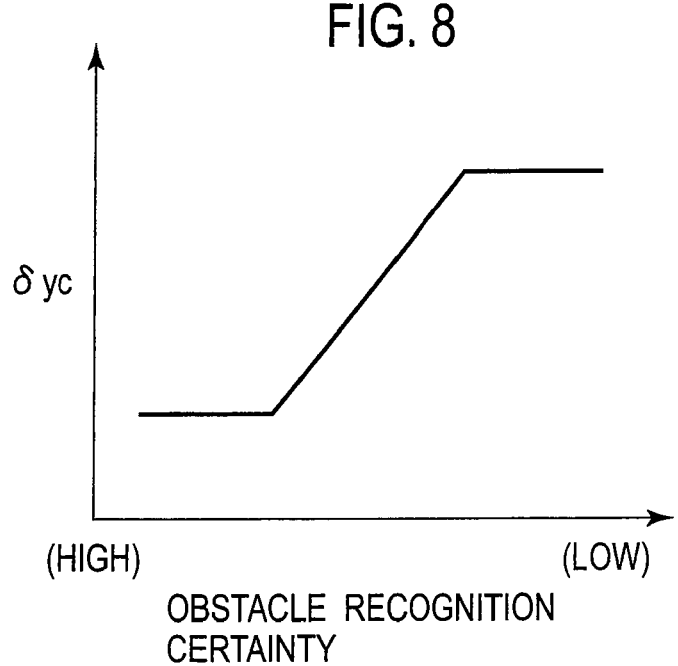
FIG. 8 is a third example of a correction amount calculation map.

Furthermore, the control start position 60 may be set based on a distance to the side obstacle SM. In this case (case where a lateral-direction relative distance ΔO between the vehicle MM and the side obstacle SM illustrated in FIG. 4 is used as the determination threshold), the correction amount δyc is calculated based on a recognition state of the obstacle SM. This calculation of the correction amount δyc is performed as follows. For example, a map having a vertical axis representing the correction amount δyc and a horizontal axis representing the obstacle recognition certainty as shown in FIG. 8 (a third example of the correction amount calculation map) is set in advance, and this map is used to calculate the correction amount δyc based on the obstacle recognition certainty. Here, the obstacle recognition certainty (recognition accuracy) is detected, for example, from an amount of a high frequency component of lateral position information of the obstacle SM detected by the radar. The larger the components of noise and deflection of the lateral-direction distance (lateral-direction relative distance ΔO) between the vehicle MM and the obstacle SM are, or the more the edge of the obstacle SM is blurred (the lower the obstacle recognition certainty is), the larger the correction amount δyc is set.

Figure 9:
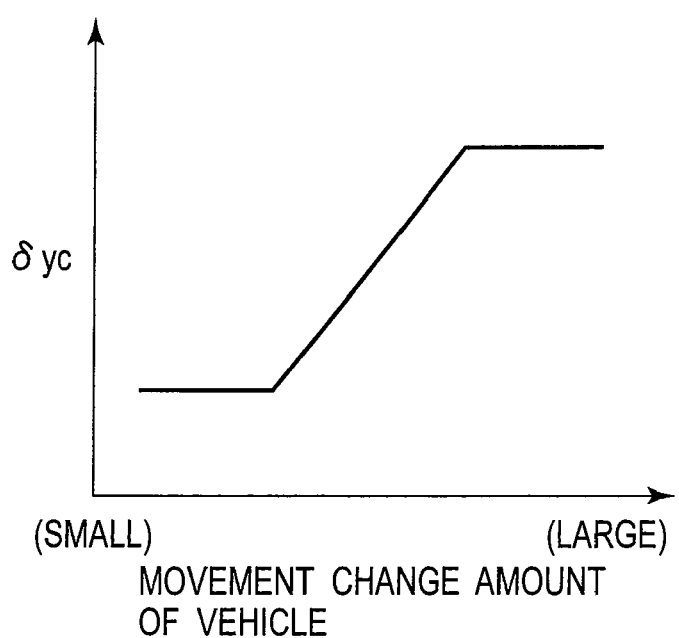
FIG. 9 is a fourth example of a correction amount calculation map.

In addition, the correction amount δyc may be calculated based on a movement state of the vehicle MM. In this case, as shown in FIG. 9 (a fourth example of the correction amount calculation map), a map having a vertical axis representing the correction amount δyc and a horizontal axis representing a movement change amount of the vehicle MM is set in advance, and this map is used to calculate the correction amount δyc based on the movement change amount of the vehicle MM. Here, the movement change amount of the vehicle MM is a parameter which indicates the stableness of the posture of the vehicle MM, and is, for example, change amounts of a steering angular velocity, a yaw rate, a lateral acceleration, and a tire lateral force per unit time which are detected respectively by the steering angle sensor 19, a yaw rate sensor, an acceleration sensor, and a lateral force sensor as a vehicle posture detector. The larger the change amounts are (the more unstable the vehicle posture is), the larger the correction amount δyc is set. Note that, the steering angular velocity, the yaw rate, the lateral acceleration, and the tire lateral force may be used as they are instead of the movement change amount. In such case, the larger the values of these are, the larger the correction amount δyc is set.

Moreover, the correction amount δyc may be set in such a way that the longer the elapse of time after the obstacle avoidance control determination flag Fout_obst changes from ON to OFF is, the smaller the correction amount δyc is set.

<Step S805>

Next, in step S805, the braking/driving force control unit 8 sets the corrected obstacle distance X2obst_h by using the correction amount δyc set in aforementioned step S804 or in step S812 to be described later. Here, the corrected obstacle distance X2obst_h is a value obtained by adding the correction amount δyc to a predetermined reference obstacle distance X2obst_0 (obstacle distance in a normal state) (X2obst_h=X2obst_0+δyc).

<Step S806>

Next, the processing proceeds to step S806 and the braking/driving force control unit 8 sets the obstacle distance X2obst on the basis of the corrected obstacle distance X2obst_h set in aforementioned step S805 and the predetermined reference obstacle distance X2obst_0 (obstacle distance in a normal state). Here, the corrected obstacle distance X2obst_h and the predetermined reference obstacle distance X2obst_0 are compared with each other, and one with the larger value is set as the obstacle distance X2obst.

$$X2obst=\max(X2obst\_h, X2obst\_0) \quad (12)$$

Specifically, between a position whose distance from the white line 200 is the corrected obstacle distance X2obst_h and a position whose distance from the white line 200 is the reference obstacle distance X2obst_0, one which is farther away from the white line 200 is selected as the control start position 60.

Note that, the obstacle distance X2obst may be limited by a predetermined value X2obst_limit. In this case, X2obst=max(X2obst_h, X2obst_0, X2obst_limit) is set.

Note that, instead of the determination threshold X2obst+X0 (obstacle distance X2obst+lateral displacement X0), the lateral-direction relative distance ΔO between the vehicle MM and the obstacle SM may be used as the determination threshold for the control start as describe above (FIG. 4). The lateral-direction relative distance ΔO is detected by using the radar devices 24L/24R (obstacle detection unit). In this case, as in the above-described correction made to the obstacle distance X2obst, correction is performed by adding the correction value ΔO_h to the lateral-direction relative distance ΔO.

<Step S807>

In step S807, the braking/driving force control unit 8 judges whether the return flag Freturn is set to "1". Then, when the return flag Freturn is "0" indicating that a return process is completed, the processing proceeds to step S808. When the return flag Freturn is Freturn=1, the processing proceeds to step S809 to be described later.

<Step S808>

In step S808, the braking/driving force control unit 8 sets the obstacle distance X2obst, and completes the control start position setting processing. In this case, the predetermined reference obstacle distance X2obst_0 is set as the obstacle distance X2obst. In the first embodiment, the predetermined reference obstacle distance X2obst_0 is set to a predetermined distance to a position outside the white line 200. Specifically, the control start position 60 is set at a position which is outside the white line 200 and is away from the white line 200 by the predetermined distance. Note that, the aforementioned predetermined reference obstacle distance X2obst_0 may be set to 0 (i.e. the control start position 60 is set at the position of the white line 200), or may be set to a predetermined distance from the white line 200 to a position inside the white line 200 (i.e. the control start position 60 is set to a predetermined lateral position inside the white line 200). For example, the control start position 60 can be appropriately set in accordance with the forward observation time period Tt in the following way or the like. The forward observation time period Tt is set to 0 and the control start position 60 is set to a position which is inside the white line 200 and is away from the white line 200 by a predetermined distance.

<Step S809>

Moreover, in step S809, the braking/driving force control unit 8 judges whether a predetermined time period has elapsed since return flag Freturn=1 is set. Here, the predetermined time is the control state hold time period described above. If the predetermined time period has not elapsed yet, the processing proceeds to step S811.

Note that, the control state hold time period may simply be the predetermined time period, but may also be, for example, a time period until a traveling distance of the vehicle MM reaches a predetermined distance. In this case, the traveling distance after return flag Freturn=1 is set is measured, and it is judged in step S809 whether the measured traveling distance has reached the predetermined distance. When the measured traveling distance reaches the predetermined distance, the processing proceeds to step S811. Alternatively, the control state hold time period may be, for example, a time period until the relative distance between the vehicle MM and the obstacle SM reaches or exceeds a predetermined distance after return flag Freturn=1 is set. As describe above, the control state hold time period is a time period which is appropriately changeable.

<Step S810>

Meanwhile, if the predetermined time (control state hold time) has elapsed after Freturn=1 is set, the processing proceeds to step S810. Here, the return flag Freturn is reset to return flag Freturn=0, and the processing then proceeds to aforementioned step S808.

<Step S811>

In step S811, the braking/driving force control unit 8 judges whether the lateral displacement X0 of the vehicle MM has increased, i.e. whether the vehicle MM has moved toward the inside of the lane. This judgment can be made based on a deviation between a latest value and a previous value (lateral displacement X0 in a previous calculation cycle) of the lateral displacement X0 of the vehicle MM, or based on a sign of the derivative of the lateral displacement X0 of the vehicle MM. When the lateral displacement X0 has increased, i.e. the vehicle MM has moved toward the inside of the lane, the processing proceeds to step S812. In other cases, the control start position setting processing is immediately completed (X2obst is held at a value calculated in the previous calculation cycle).

<Step S812>

In step S812, the braking/driving force control unit 8 performs a correction of the correction amount δyc set in the previous calculation cycle, and the processing proceeds to aforementioned step S805. Here, the correction amount δyc is corrected by calculating the deviation (referred to as lateral displacement deviation) between the latest value and the previous value (lateral displacement X0 in the previous calculation cycle) of the lateral displacement X0 of the vehicle MM and then subtracting the lateral displacement deviation from the correction amount δyc set in the previous calculation cycle. Thus, when the processing proceeds to step S805 via step S812, the corrected obstacle distance X2obst_h set in step S805 is decreased in accordance with the movement (increase in the lateral displacement X0) of the vehicle MM when the vehicle MM moves toward the inside of the lane.

<Step S90>

Returning to FIG. 3, in step S90, the braking/driving force control unit 8 performs the determination of control start.

Here, the braking/driving force control unit 8 determines to start the control when the following formula is satisfied in a state where the side obstacle SM is detected.

$$\Delta X2 = \Delta Xb - X0 \geq X2\text{obst} \tag{13}$$

Specifically, as shown in FIG. 4, it is judged whether the lateral distance ΔX2 between the white line 200 and the future position 150 of the vehicle MM (position of the vehicle after the forward observation time period Tt, and is also referred to as forward observation point 150) has reached or exceeded the obstacle distance X2obst. Here, aforementioned formula (13) can be transformed as follows.

$$\Delta Xb \geq X2\text{obst} + X0 \tag{14}$$

In other words, it is judged whether the future vehicle position 150 is at the control start position 60 or is outside the control start position 60 in the lane width direction, in the state where the side obstacle SM is detected.

Then, when the condition described above is satisfied, it is assumed that a lane change operation toward the obstacle SM or the like has been performed and the control with respect to the obstacle SM is determined to be started. When the control with respect to the obstacle SM is determined to be started, the obstacle avoidance control determination flag Fout_obst is set to ON. Meanwhile, if the condition described above is not satisfied, the obstacle avoidance control determination flag Fout_obst is set to OFF.

Note that, when the lateral-direction relative distance ΔO between the vehicle MM and the obstacle SM is used as the determination threshold for the control start, the control start is determined when the following formula is satisfied.

$$\Delta Xb \geq \Delta O \tag{15}$$

The predicted vehicle position ΔXb is actually obtained for each of the left side and the right side of the vehicle as ΔXbL/ΔXbR, and the determination is made individually for ΔXbL/ΔXbR.

Moreover, the obstacle SM being the control target may include not only a vehicle to the rear and sides of the vehicle MM but also an on-coming vehicle in an adjacent lane in front of the vehicle MM.

Here, when it is judged whether the future prediction position ΔXb is smaller than the determination threshold, a hysteresis of F may be provided in such a manner that ΔX2<X2obst−F. In other words, a dead band may be provided. Specifically, the dead band may be provided between a control intervention threshold and a control completion threshold.

Further, Fout_obst is settable to ON when Fout_obst is OFF. Moreover, a time condition such as elapse of a predetermined time period after Fout_obst is set to OFF may be added to the condition allowing Fout_obst to be set to ON.

In addition, when a predetermined time period Tcontrol elapses after the determination of setting Fout_obst to ON, the Fout_obst=OFF may be set to complete the control. However, in the case where Fout_obst=OFF is set after the predetermined time period elapses from the determination of setting Fout_obst to ON as described above, the lateral direction distance ΔX2 between the white line 200 and the future position 150 (forward observation point 150) of the vehicle MM is not necessarily smaller than the obstacle distance X2obst when Fout_obst=OFF is set. Accordingly, in this case, processing of a flowchart of FIG. 10 is preferably performed instead of the processing illustrated in the flowchart of FIG. 5 described above.

Figure 10:
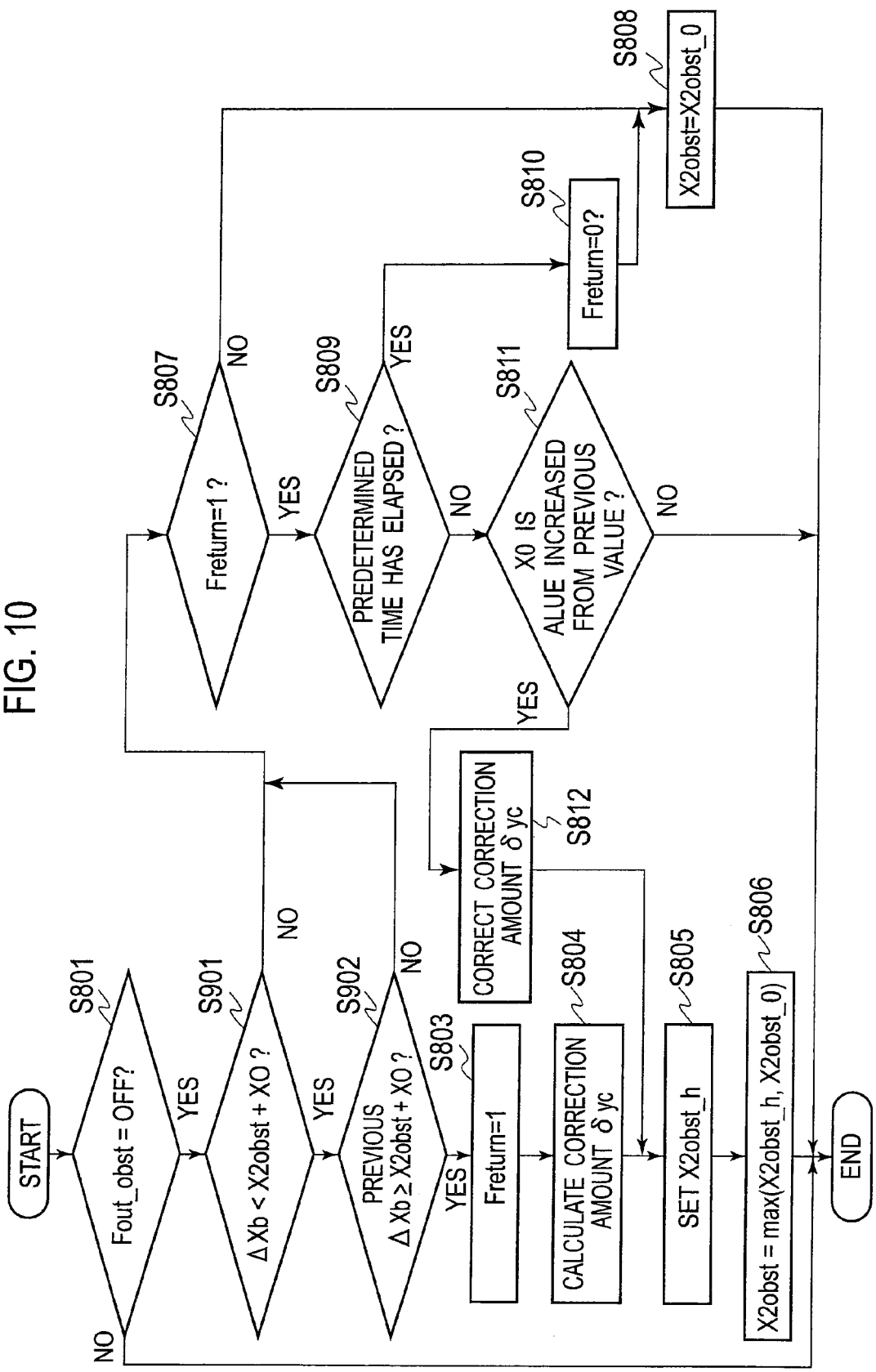
FIG. 10 is a flowchart showing a second example of the control start position setting processing procedure.

The flowchart of FIG. 10 (a second example of the control start position setting processing procedure) is provided with processes of step S901 and step S902 in place of the process of step S802 in the flowchart of FIG. 5 described above, and other processes are the same as those of the flowchart of FIG. 5. Accordingly, the processes of step S901 and step S902 are described.

<Step S901>

In step S901, the braking/driving force control unit 8 judges whether the predicted vehicle position ΔXb is smaller than the determination threshold X2obst+X0 (obstacle distance X2obst+lateral displacement X0). In other words, the braking/driving force control unit 8 judges whether the future position 150 (forward observation point 150) of the vehicle MM is inside the control start position 60 in the lane width direction. When the predicted vehicle position ΔXb is smaller than the determination threshold X2obst+X0 (obstacle distance X2obst+lateral displacement X0), the processing proceeds to step S902, and in other cases, the processing proceeds to aforementioned step S807. Note that, the determination threshold in aforementioned step S901 may not be strictly X2obst+X0, and may include a hysteresis hys in such a manner that X2obst+X0−hys, for example.

<Step S902>

In step S902, the braking/driving force control unit 8 judges whether the predicted vehicle position ΔXb in the previous calculation cycle is equal to or larger than the determination threshold X2obst+X0 (obstacle distance X2obst+lateral displacement X0). In other words, the braking/driving force control unit 8 judges whether the future position 150 (forward observation point 150) of the vehicle MM in the previous calculation cycle is the control start position 60, or is outside the control start position 60 in the lane width direction. When the predicted vehicle position ΔXb in the previous calculation cycle is equal to or larger than the determination threshold X2obst+X0 (obstacle distance X2obst+lateral displacement X0), the processing proceeds to aforementioned step S803, and in other cases, the processing proceeds to aforementioned step S807.

Here, the case where it is judged in step S901 that the predicted vehicle position ΔXb is smaller than the determination threshold X2obst+X0 (obstacle distance X2obst+lateral displacement X0) (judged Yes in step S901) and it is judged in step S902 that the predicted vehicle position ΔXb in the previous calculation cycle is equal to or larger than the determination threshold X2obst+X0 (obstacle distance X2obst+lateral displacement X0) (judged Yes in step S902) is a case where the future position 150 (forward observation point 150) of the vehicle MM being outside the control start position 60 in the lane width direction in the previous calculation cycle moves to a position inside the control start position 60 in the lane width direction in the latest calculation cycle.

Here, consider the case where the obstacle avoidance control determination flag Fout_obst is set to OFF even when the predicted vehicle position ΔXb is not smaller than the determination threshold X2obst+X0 (obstacle distance X2obst+lateral displacement X0) (for example, the case where the obstacle avoidance control determination flag Fout_obst is set to OFF after a predetermined time period has elapsed since the obstacle avoidance control determination flag Fout_obst is set to ON, the case where the obstacle avoidance control determination flag Fout_obst is set to OFF by intervention of another control, or the like). In such case, even when the obstacle avoidance control determination flag Fout_obst is judged to be set to OFF in step S801, the predicted vehicle position ΔXb may not be actually smaller than the determination threshold X2obst+X0 (obstacle distance X2obst+lateral displacement X0). Accordingly, it is preferable that, when the obstacle avoidance control determination flag Fout_obst is judged to be OFF in step S801, the judgment processes of step S901 and step S902 are performed to judge whether the future position 150 (forward observation point 150) of the vehicle MM being outside the control start position 60 in the lane width direction in the previous calculation cycle moves to a position inside the control start position 60 in the lane width direction in the latest calculation cycle.

Note that, in the process of step S902, it may also be judged whether the white line 200 is recognized in a previous calculation cycle. Specifically, it is judged in step S902 whether the predicted vehicle position ΔXb in the previous calculation cycle is equal to or larger than the determination threshold X2obst+X0 (obstacle distance X2obst+lateral displacement X0), or whether the white line 200 is recognized in the previous calculation cycle. When the predicted vehicle position ΔXb in the previous calculation cycle is equal to or larger than the determination threshold X2obst+X0 (obstacle distance X2obst+lateral displacement X0), or when the white line 200 is not recognized (or the recognition accuracy of the white line 200 is low) in the previous calculation cycle, the processing proceeds to the process of step S803. In other cases, the processing proceeds to the process of step S807.

When the white line 200 is not recognized in the previous calculation cycle, the white line recognition accuracy is deteriorated, and thus there is a possibility of error in the lateral position of the recognized white line 200. Generally, the white line 200 is detected by capturing an image of a road surface to the front of the vehicle, and then subjecting the captured image to edge processing (processing for detecting luminance change points in the image). However, the white line 200 may not be accurately detected in, for example, a snowy road, since the luminance of snow on the road surface is high. When the white line recognition accuracy is deteriorated as in the above-described case, or when there is an error in the lateral position of the recognized white line 200, a shake (frequent change of the lateral position) occurs in the lateral position of the white line 200. This causes the value of the determination threshold X2obst+X0 (obstacle distance X2obst+lateral displacement X0) to also change frequently. As a result, even when there is no change in the predicted vehicle position ΔXb, the predicted vehicle position ΔXb may change frequently from a value smaller than the determination threshold X2obst+X0 (obstacle distance X2obst+lateral displacement X0) to a value equal to or larger than that, or from a value equal to or larger than that to a value smaller than that. This may cause the control to become unstable.

It is preferable that the following process is performed in order to prevent the control from becoming unstable due to the white line recognition accuracy. In step S902, it is judged whether the white line is recognized in the previous calculation cycle. When the white line is not recognized (or the white line recognition accuracy is low) in the previous calculation cycle, the processing proceeds to the processes of steps S803, S804, S805, and the corrected obstacle distance X2obst_h is set.

Moreover, while the obstacle avoidance control is executed, a control execution direction Dout_obst is judged from a judged direction of the predicted vehicle position ΔXb. When the predicted vehicle position ΔXb is on the left side, Dout_obst=LEFT is set, and when the predicted vehicle position ΔXb is on the right side, Dout_obst=RIGHT is set.

Here, when the anti-skid control (ABS), traction control (TCS), or vehicle dynamics control (VDC) system is operating, the obstacle avoidance control determination flag Fout_obst may be set to OFF. This setting is made, so that the obstacle avoidance control is not activated while the automatic braking control is activated.

<Step S100>

Next, in step S100, the braking/driving force control unit 8 performs a process of producing a warning.

Here, the warning is produced when it is judged in aforementioned step S90 that the control start position 60 (determination threshold) is reached.

Note that, the warning may be produced before the forward observation point 150 (future position) based on the aforementioned forward observation time period Tt reaches the control start position 60. For example, the forward observation time period Tt is multiplied by a predetermined gain Kbuzz (>1) in such a way that the forward observation time period Tt is made longer than that used in the detection of aforementioned step S90. Then, the warning is produced when it is judged that the forward observation point 150 (future position) calculated using (Tt·Kbuzz) on the basis of aforementioned formula (6) has reached the control start position 60 in aforementioned step S90.

Moreover, it is possible that the warning is produced when it is judged in aforementioned step S90 that the operation of an obstacle avoidance system is to be started, and the control is started after an elapse of predetermined time from the production of warning.

Furthermore, it is possible that, in step S90, the determination of the control start is made by using the determination threshold set in aforementioned step S80, while in step 100, a pre-corrected determination threshold (determination threshold X2obst_0 in the normal state) is used to produce the warning. In this case, a warning start is not suppressed, and only the control start is actually suppressed.

<Step S110>

Next, in step S110, the braking/driving force control unit 8 sets a target yaw moment Ms.

When the obstacle avoidance control determination flag Fout_obst is OFF, the target yaw moment Ms is set to zero, and the processing proceeds to step S120.

Figure 11:
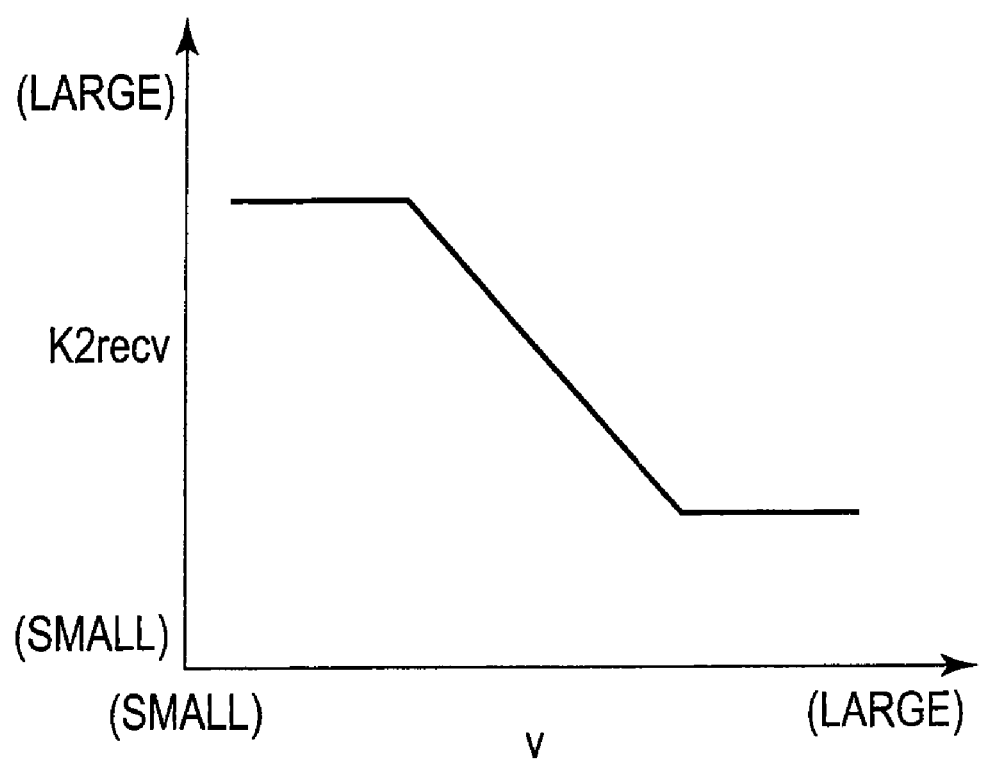
FIG. 11 is a graph showing characteristics of a gain K2recv.

Meanwhile, when the obstacle avoidance control determination flag Fout_obst is ON, the target yaw moment Ms is calculated from the following formula, and the processing proceeds to step S120.

$$Ms = K1recv \cdot K2recv \neq \Delta Xs \quad (16)$$

$$\Delta Xs = (K1mon \cdot \phi_{front} + K2mon \cdot \phi m)$$

where K1reccv is a proportional gain (yaw moment of inertia) determined from the specifications of the vehicle and K2recv is a gain which changes depending on the vehicle speed V. An example of the gain K2recv is shown in FIG. 11. As shown in FIG. 11, for example, the gain K2recv has a large value in a low speed region. When the vehicle speed V reaches a certain value, the gain K2recv becomes inversely proportional to the vehicle speed V. Thereafter, when the vehicle speed V reaches another certain value, the gain K2recv becomes equal to a constant value which is a small value. Moreover, a setting gain K1mon is a value using the vehicle speed V as a function. Furthermore, a setting gain K2mon is a value using the vehicle speed and the forward observation time period Tt as functions.

In aforementioned formula (16), the target yaw moment Ms increases as the yaw angle φ between the vehicle MM and the white line 200 and the yaw rate constantly generated by additional steering of the driver increases.

Alternatively, the target yaw moment Ms can be calculated from formula (17) described below. This formula (17) is synonymous with multiplication of aforementioned formula (16) by a gain K3 (=1/Tt$^2$). The gain K3 (=1/Tt$^2$) is such a gain that decreases as the forward observation time period Tt increases.

$$Ms = K1recv \cdot \Delta Xb / (L \cdot Tt^2) \quad (17)$$

When aforementioned formula (17) is used the following is achieved. The shorter the forward observation time period Tt is, the larger the control amount is. In other words, when the forward observation time period is set to be short, the control amount at the control start is large. Meanwhile, when the forward observation time period is set to be long, the control amount is small. As a result, making the control amount correspond to the setting of the forward observation time period Tt allows a driver to be provided with a control which matches the situation and has less feeling of strangeness.

Note that, the judgment of Fout_obst described above is performed to predict future lane change on the basis of steering information.

<Step S120>

In step S120, the braking/driving force control unit 8 calculates a command to generate the target yaw moment Ms for avoiding the obstacle, outputs the calculated command, and then returns to the first process.

Here, in the first embodiment, description are given below of an example of the case where the yaw moment is generated by using a braking/driving force as means for generating the target yaw moment Ms for avoiding the obstacle.

Note that, when a steering reactive force control device is used as the means for generating the yaw moment, the braking/driving force control unit 8 may calculate a steering reactive force Frstr as the command to generate the target yaw moment Ms, where Frstr=Ka·Ms, and then output the steering reactive force Frstr to the steering reactive force device to generate the reactive force. Note that, aforementioned Ka is a predetermined coefficient to convert the yaw moment to the steering reactive force, which is obtained from an experiment or the like.

Moreover, when a steering angle control device is used as the means for generating the yaw moment, the braking/driving force control unit 8 may calculate a steering angle STRθ as the command to generate the target yaw moment Ms, where STRθ=Kb·Ms, and then output the steering angle STRθ to the steering angle control device to control the steering angle. Note that, aforementioned Kb is a predetermined coefficient to convert the yaw moment to the steering angle, which is obtained from an experiment or the like.

Furthermore, when a steering force control device such as a power steering system is used as the means for generating the yaw moment, the braking/driving force control unit 8 may calculate the steering force (steering torque) of the steering force control device as the command to generate the target yaw moment Ms, where STRtrg=Kc·Ms, and then output the steering force to the steering force control device to control the steering force. Note that, aforementioned Kc is a predetermined coefficient to convert the yaw moment to the steering force, which is obtained from an experiment or the like.

Additionally, when a generation of a brake force between the right and left wheels of the vehicle is used as the means of generating the yaw moment, the braking/driving force control unit 8 calculates the command to generate the target yaw moment Ms as described below.

When the target yaw moment Ms is zero, i.e. when a judgment result of such a condition that the yaw moment control is not to be performed is obtained, the following control is performed. As shown in formula (18) and formula (19) described below, brake hydraulic pressures (brake hydraulic pressures) Pmf, Pmr are outputted to the brake fluid pressure control unit 7 as target brake hydraulic pressures Psi (i=fl, fr, rl, rr) of the respective wheels. Then, the brake fluid pressure control unit 7 controls the fluid pressure circuit, and the brake hydraulic pressures of the respective wheels are thus controlled to be equal to the target brake hydraulic pressures Psi (i=fl, fr, rl, rr).

$$Psfl=Psfr=Pmf \quad (18)$$

$$Psrl=Psrr=Pmr \quad (19)$$

where Pmf is a front-wheel brake hydraulic pressure and Pmr is a rear-wheel brake hydraulic pressure. The rear-wheel brake hydraulic pressure Pmr has a value calculated based on the front-wheel brake hydraulic pressure Pmf in consideration of front/rear distribution. For example, when the driver performs a brake operation, the brake hydraulic pressures Pmf, Pmr have respective values corresponding to an operation amount (master cylinder hydraulic pressure Pm) of the brake operation.

Meanwhile, when the absolute value of the target yaw moment Ms is larger than zero, i.e. when a judgment result of performing the obstacle avoidance control is obtained, the following process is performed.

Specifically, a front-wheel target brake hydraulic pressure difference ΔPsf and a rear-wheel target brake hydraulic pressure difference ΔPsr are calculated based on the target yaw moment Ms. To be more concrete, the target brake hydraulic pressure differences ΔPsf, ΔPsr are calculated respectively from formula (20) and formula (21) described below.

$$\Delta Psf=2\cdot Kbf\cdot(Ms\cdot FRratio)/Tr \quad (20)$$

$$\Delta Psr=2\cdot Kbr\cdot(Ms\times(1-FRratio))/Tr \quad (21)$$

where FR ratio is a threshold for setting, Tr is a tread, Kbf and Kbr are conversion factors for the respective front and rear tires, which are used to convert the braking forces to the brake hydraulic pressures.

Note that, the tread Tr described above is the same for the front and rear for the sake of convenience. Moreover, Kbf, Kbr are factors determined in advance from brake specifications.

As described above, the braking forces generated in the wheels are distributed in accordance with the size of the target yaw moment Ms. In other words, the target brake hydraulic pressure differences ΔPsf, ΔPsr are each provided with a predetermined value, and thus a braking force difference is generated between the right and left front wheels and between the right and left rear wheels. The calculated target brake hydraulic pressure differences ΔPsf, ΔPsr are used to calculate the eventual target brake hydraulic pressures Psi (i=fl, fr, rl, rr) of the respective wheels.

Specifically, when the control execution direction Dout_obst is LEFT, i.e. when the obstacle avoidance control against the obstacle SM on the left side is to be performed, the target brake hydraulic pressures Psi (i=fl, fr, rl, rr) of the respective wheels are calculated from formula (22) described below.

$$Psfl=Pmf,$$

$$Psfr=Pmf+\Delta Psf,$$

$$Psrl=Pmr,$$

$$Psrr=Pmr+\Delta Psr \quad (22)$$

Meanwhile, when the control execution direction Dout_obst is RIGHT, i.e. when the obstacle avoidance control against the obstacle SM on the right side is to be performed, the target brake hydraulic pressures Psi (i=fl, fr, rl, rr) of the respective wheels are calculated from formula (23) described below.

$$Psfl=Pmf+\Delta Psf,$$

$$Psfr=Pmf,$$

$$Psrl=Pmr+\Delta Psr,$$

$$Psrr=Pmr \quad (23)$$

In aforementioned formula (22) and formula (23), the braking force difference between the left and right wheels are generated in a way that the braking forces of the wheels on the obstacle avoidance side are set to be larger.

Moreover, as shown in formula (22) and formula (23), the target brake hydraulic pressures Psi (i=fl, fr, rl, rr) of the respective wheels are calculated in consideration of the brake operation by the driver, i.e. the brake hydraulic pressures Pmf, Pmr.

Then, the braking/driving force control unit 8 outputs the thus-calculated target brake hydraulic pressures Psi (i=fl, fr, rl, rr) of the respective wheels as the brake fluid pressure command values to the brake fluid pressure control unit 7. Then, the brake fluid pressure control unit 7 controls the fluid pressure circuit, and the brake fluid pressures of the respective wheels are controlled to be equal to the target brake hydraulic pressures Psi (i=fl, fr, rl, rr).

(Operation)

Next, an operation of the first embodiment is described.

Figure 12:
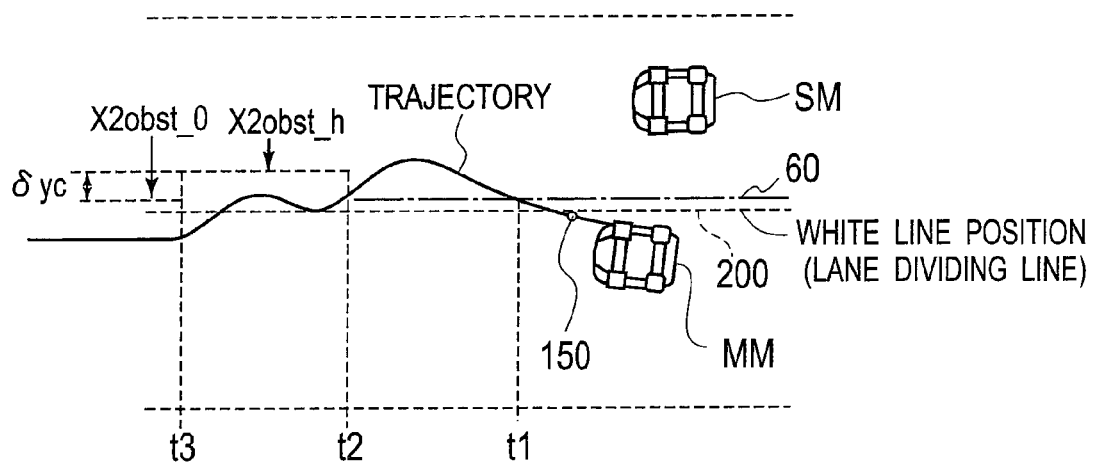
FIG. 12 is a view for explaining an operation of the first embodiment of the invention.

FIG. 12 is a view for explaining the operation of the first embodiment.

It is assumed that the vehicle MM is currently traveling in the center of the vehicle traveling lane. In this case, obstacle avoidance control determination flag Fout_obst=OFF and return flag Freturn=0. In addition, the obstacle distance X2obst being the determination threshold for starting the control of preventing the vehicle MM from approaching the side obstacle SM is X2obst_0, which is the obstacle distance at the normal state.

It is assumed that, from this state, the vehicle MM moves toward the obstacle (adjacent vehicle) SM. At this time, the predicted vehicle position ΔXb is first calculated as a distance between the current lateral position of the vehicle MM and the lateral position of the vehicle MM after the forward observation time period Tt, on the basis of the yaw angle $\phi_{front}$, the yaw angular velocity φm, and the like which are the traveling state of the vehicle MM (step S70 of FIG. 3).

Then, when ΔXb≧X2obst(=X2obst_0)+X0 is established at a time t1 of FIG. 12 (see FIG. 4 also), the vehicle driving support control for avoiding the obstacle is determined to be started, and obstacle avoidance control determination flag Fout_obst=ON is set (step S90). As described above, the control start is determined when the predicted vehicle position ΔXb reaches the lane-width-direction lateral position (X2obst+X0), the predicted vehicle position ΔXb being the future vehicle position at the time when the adjacent vehicle SM is detected. In other words, the control is started when the lateral position of the vehicle MM after the forward observation time period Tt reaches the control start position 60 being a position outside the white line 200 by X2obst in the lane width direction.

When the vehicle driving support control start is determined, the target yaw moment Ms is calculated as the control amount on the basis of the predicted vehicle position ΔXb (step S110), and the braking/driving difference between the left and right wheels of the vehicle is controlled in such a way that the target yaw moment Ms is generated (step S120). Specifically, in FIG. 12, the braking forces of the left wheels of the vehicle are controlled to be larger than those of the right wheels on the basis of the target yaw moment Ms. This generates a yaw moment in such a direction that the vehicle MM is prevented from approaching the adjacent vehicle SM (in a direction toward the center of the vehicle traveling lane), and the vehicle MM is thus controlled.

When the driver recognizes the side obstacle SM due to this vehicle driving support control for avoiding the obstacle and the vehicle MM tries to return to the center of the lane, in the course of returning, the predicted vehicle position ΔXb returns to the inside of the control start position 60 at a time t2. In other words, ΔXb<X2obst+X0 is established. This causes obstacle avoidance control determination flag Fout_obst=OFF to be set.

At this time, the previous value of the obstacle avoidance control determination flag Fout_obst is ON. Thus, return flag Freturn=1 is set (step S80 of FIG. 5). Then, the control start position 60 set at a position outside the white line 200 in the lane width direction by the predetermined reference obstacle distance X2obst_0 at this time is set further outward in the lane width direction by the correction amount δyc. In other words, when X2obst=X2obst_h (step S806) is set, the corrected control start position 60 is located closer to the obstacle than the control start position 60 before the correction, i.e. farther from the traveling lane. Thus, the frequency of the control start is reduced.

Thereafter, when the predetermined time period elapses from the time t2 at which return flag Freturn=1 is set (S809 of FIG. 5), return flag Freturn=0 is set (S810 of FIG. 5) and the obstacle distance X2obst is returned to the reference value (X2obste_0) (S808 of FIG. 5) at a time t3.

Figure 13:
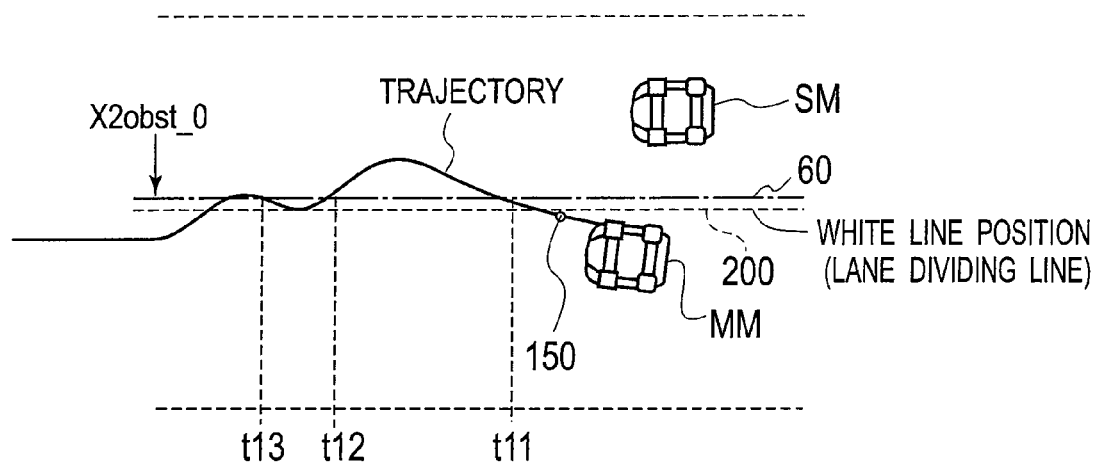
FIG. 13 is a view for explaining an operation of a conventional technique.

In contrast to the first embodiment in which the control start position 60 is corrected, the control start position 60 is not corrected in the conventional method. In the conventional method, the control start position 60 does not change even when the predicted vehicle position ΔXb returns to the inside of the control start position 60 at a time 12 after the control is started at a time t11 of FIG. 13. In other words, the obstacle distance X2obst is maintained at the reference obstacle distance X2obst_0.

Accordingly, when the steering of the driver causes the predicted vehicle position ΔXb to be unstable after the time t12 and the ΔXb≧Xobst(=X2obst_0)+X0 is thereby established at a time t13, the control is started again at this time point. Specifically, for example, when the traveling direction of the vehicle MM is a direction toward the inside of the lane at a time point between the time t12 and the time t13, the driver sometimes performs a steering operation outward of the lane (upward in the drawing) to match the traveling direction of the vehicle MM to the extending direction of the lane (to reduce the yaw angle $\phi_{front}$ of the vehicle MM). In such a case, the driver performs the steering operation to change the posture (yaw angle) of the vehicle MM in the process of returning the vehicle MM to the inside of the lane. The control intervenes again even in such a situation where the driver is performing a steering which has no intention of moving the vehicle toward the obstacle.

As described above, there is the case where the obstacle avoidance control intervenes again even though the driver recognizes the obstacle SM and is trying to return to the inside of the traveling lane. This control gives the driver the feeling of strangeness. Particularly, the longer the forward observation time period Tt is, the more likely the future vehicle position after the setting time period is to be unstable by the steering of the driver. Accordingly, in the method of determining the start of the obstacle avoidance control by using the future vehicle position, an unnecessary recontrol is likely to be performed, and the driver is more likely to be given the feeling of strangeness.

On the other hand, in the first embodiment, when the future vehicle position 150 returns to the inside of the control start position 60 after the control start (time t1), the control start position 60 is changed to a position farther from the traveling lane by the correction amount δyc for the predetermined time period (period from the time t2 to the time t3 of FIG. 12) after the returning. Accordingly, even when the vehicle prediction ΔXb is unstable and the ΔXb≧X2obst_0+X0 is thereby established in the period (predetermined time period) from the time t2 to the time t3, the control start is suppressed. This is because the distance from the white line 200 to the control start position 60 is changed from the reference obstacle distance X2obst_0 to the corrected obstacle distance X2obst_h and ΔXb<X2obst_h+X0 is thereby established. As a result, the obstacle avoidance control is made inactive. Hence, the feeling of strangeness given to the driver due to the unnecessary intervention of control can be reduced.

Moreover, the suppression amount of the determination of control start may be adjusted by setting the corrected obstacle distance X2obst_h in accordance with the lane width of the vehicle traveling lane, the distance to the opposite-side obstacle existing on the side opposite to the avoidance control target, the white line recognition certainty, the obstacle recognition certainty and the like. Specifically, the determination of control start is largely suppressed in the following ways. The narrower (smaller) the lane width is, or the shorter (smaller) the distance between the opposite-side obstacle and the vehicle MM is, the larger the correction amount δyc is set (see FIG. 6). Furthermore, the lower the white line recognition certainty is, the larger the correction amount δyc is set (see FIG. 7). Moreover, the lower the obstacle recognition certainty is, the larger the correction amount δyc is set (see FIG. 8). Additionally, the lower the stableness of the vehicle posture of the vehicle MM lower is (the larger the movement change amount of the vehicle MM is), the larger the correction amount δyc is set (see FIG. 9). Hence, the determination of starting the vehicle driving support control can be made while achieving reduction in the feeling of strangeness given to the driver.

Note that, in FIG. 1, the radar devices 24L/24R form the side obstacle detection unit 25. Moreover, step S70 of FIG. 3 corresponds to the future position predictor 8A, step S80 corresponds to the control suppression part 8Ba, step S90 corresponds to the control start determination part 8B, and steps S100 to S120 correspond to the vehicle controller 8C.

(Effects)

(1) The control start determination part 8B determines to start the control when the lateral position of the vehicle MM in the lane width direction reaches the control start position 60 being the predetermined lateral position in the lane width direction. When the control start determination part 8B determines to start the control, the vehicle controller 8C controls the vehicle MM by causing a yaw moment toward the center of the vehicle traveling lane to be applied the vehicle MM.

When the lateral position of the vehicle MM in the lane width direction moves from a position outside the control start position 60 to a position approaching the vehicle traveling lane inside the control start position 60 in the lane width direction, the control suppression part 8Ba suppresses the control of applying the yaw moment to the vehicle MM until the predetermined control state hold time period elapses after the lateral position of the vehicle MM in the lane width direction moves to the position approaching the vehicle traveling lane, compared to the period before the movement to the position approaching the vehicle traveling lane.

As describe above, when the lateral position of the vehicle MM in the lane width direction changes from the outside to the inside of the control start position 60, the control of vehicle MM is suppressed by suppressing the determination of control start until the control state hold time period elapses. Accordingly, even when the lateral position of the vehicle MM in the lane width direction is unstable, the unnecessary intervention of control is suppressed.

This allows the vehicle driving support to be appropriately performed while suppressing the control start which gives the feeling of strangeness to the driver.

(2) The future position predictor 8A predicts the future vehicle position 150 (predicted vehicle position ΔXb being the distance from the current lateral position of the vehicle to the future vehicle position 150) after the setting time period (forward observation time period Tt) from the current time.

Accordingly, cancelation of an unnecessary control and intervention of a control desired to be performed can be achieved early.

(3) When the lateral position of the vehicle MM in the lane width direction moves from a position outside of the control start position 60 in the lane width direction to a position approaching the vehicle traveling lane inside the control start position 60 in the lane width direction, the control suppression part 8Ba suppresses the control by changing the control start position 60 to a position farther away from the vehicle traveling lane in the lane width direction.

This allows the determination of control start to be suppressed in a relatively simple way.

(4) A lane width detector (image capturing unit 13) detects the line width of the vehicle traveling lane. The control suppression part 8Ba suppresses the control more as the lane width of the vehicle traveling lane detected by the lane width detector becomes narrower (image capturing unit 13) (see FIG. 6).

As described above, the narrower the lane width of the vehicle traveling lane is, the larger the change amount (correction amount δyc) of the control start position 60 is set in such a way that the control start position 60 is farther away from the vehicle traveling lane (closer to the obstacle SM). Therefore, the following can be said. The narrower the lane width is, the more frequently the driver performs the steering operation. Thus, the unnecessary intervention of control can be suppressed in a situation where the lane width is narrow and the position of the vehicle MM is likely to sway.

(5) The obstacle distance detector (radar devices 24L/24R) detects the distance between the vehicle MM and the opposite-side obstacle existing on a side to which the vehicle MM is to laterally move by the control of the vehicle controller 8C. The control suppression part 8Ba suppresses the control more as the distance between the vehicle MM and the opposite-side obstacle detected by the obstacle distance detector (radar devices 24L/24R) becomes shorter (see FIG. 6).

As described above, the shorter the distance is to the opposite-side obstacle existing on the side opposite to the control target obstacle SM, the larger the change amount (correction amount δyc) of the control start position 60 is set in such a way that the control start position 60 is farther away from the vehicle traveling lane (closer to the obstacle SM). Therefore, the following can be said. The shorter the distance is to the opposite-side obstacle existing on the side opposite to the control target obstacle SM, the more frequently the driver performs the steering operation. Thus, the unnecessary intervention of control can be suppressed in a situation where the distance to the opposite-side obstacle existing on the side opposite to the control target obstacle SM is short and the position of the vehicle is likely to sway.

(6) The vehicle posture detector (steering angle sensor 19, yaw rate sensor, acceleration sensor, lateral force sensor, and the like) detects the stableness of the vehicle posture of the vehicle MM. The control suppression part 8Ba suppresses the control more as the stableness of the vehicle posture of the vehicle MM detected by the vehicle posture detector (steering angle sensor 19, yaw rate sensor, acceleration sensor, lateral force sensor, and the like) becomes lower (as the motion change amount of the vehicle MM becomes larger) (see FIG. 9).

This allows the unnecessary intervention of control to be suppressed in a situation where the motion change of the vehicle MM is likely to change at a relatively large degree, such as a situation where the vehicle MM is traveling through a curve.

(7) A lane dividing line detector (image capturing unit 13) detects a lane dividing line (white line 200) of the vehicle traveling lane. Upon detecting the lane dividing line, the lane dividing line detector (image capturing unit 13) determines the recognition certainty of the lane dividing line. The control start position 60 is set at a position which is away from the position of the lane dividing line by the predetermined distance X2obst in the lane width direction, the lane dividing line detected by the lane dividing line detector. The control suppression part 8Ba suppresses the control more as the recognition certainty of the lane dividing line determined by the lane dividing line detector becomes lower (see FIG. 7).

In other words, the control start position 60 is set at the position which is away from the lane dividing line (white line 200) by the predetermined distance X2obst, and the control start is determined based on whether the lateral direction distance ΔX2 from the white line 200 to an estimated future position (future vehicle position 150) reaches the threshold X2obst.

Furthermore, the larger the variation (variation in lateral position) in the recognition result of white line 200 (lane dividing line) is, the larger the change amount (correction amount δyc) of the control start position 60 is set in such a way that the control start position 60 is farther away from the vehicle traveling lane (closer to the obstacle SM). Therefore, the following can be said. When the recognition certainty of the lane dividing line is low, the lateral position of the recognized lane dividing line varies and thus variation occurs also in the control start position 60. Hence, the unnecessary intervention of control is more likely to occur. Hence, the lower the recognition certainty of the lane dividing line is, the more the control is suppressed. This allows the unnecessary intervention of control to be suppressed even when the lateral position of the recognized lane dividing line varies.

(8) The side obstacle detection unit 25 detects the side obstacle SM existing to the side of the vehicle MM. The control start determination part 8B determines to start the control when the lateral position of the vehicle MM in the lane width direction reaches the control start position 60 in the state where the side obstacle detection unit 25 is detecting the side obstacle SM.

This allows the vehicle driving support control against the side obstacle SM to be appropriately performed while suppressing the control start which gives the feeling of strangeness to the driver.

(9) Upon detecting the side obstacle SM, the side obstacle detection unit 25 determines the side obstacle recognition certainty. The control start position 60 is set based on the vehicle MM and the distance (lateral-direction relative distance ΔO) (between the vehicle MM and the obstacle SM) in the lane width direction which is detected by the side obstacle detection unit 25. The control suppression part 8Ba suppresses the control more as the side obstacle recognition certainty determined by the side obstacle detection unit 25 becomes lower (see FIG. 8).

In other words, the control start is determined based on whether the predicted future position $\Delta Xb$ of the vehicle MM reaches the lateral-direction relative distance $\Delta O$ between the vehicle MM and the detected obstacle SM.

Furthermore, the larger the variation in the recognition result of the obstacle SM is, the larger the change amount (correction amount $\delta yc$) of the control start position 60 is set in such a way that the control start position 60 is farther away from the vehicle traveling lane (closer to the obstacle SM). This allows the unnecessary intervention of control to be suppressed even when the obstacle SM sways or even when a swaying relationship between the vehicle MM and the obstacle SM is relatively large.

(10) The control start is determined when the lateral position of the vehicle MM in the lane width direction reaches the control start position 60 being the predetermined lateral position in the lane width direction which is an approach prevention indicator for the vehicle MM, and the yaw moment toward the center of the vehicle traveling lane is applied the vehicle MM to control the vehicle MM. Moreover, when the lane-width-direction lateral position $\Delta Xb$ of the vehicle MM moves from a position outside the control start position 60 in the traveling-lane width direction to a position approaching the traveling lane inside the control start position 60 in the lane width direction, the control of applying the yaw moment to the vehicle MM is suppressed until the predetermined control state hold time period elapses after the lane-width-direction lateral position $\Delta Xb$ of the vehicle MM moves to the position approaching the vehicle traveling lane, compared to the period before the movement to the position approaching the vehicle traveling lane.

This allows the approach to the obstacle SM to be appropriately prevented while suppressing the control start which gives the feeling of strangeness to the driver.

Second Embodiment

Next, a second embodiment of the invention is described.

In the first embodiment described above, the control start is suppressed by adjusting the control start position 60 used for the control start. Meanwhile, in the second embodiment, the control start is suppressed by adjusting a forward observation time period Tt.

(Configuration)

A basic configuration of the second embodiment is the same as that of the first embodiment described above.

Figure 14:
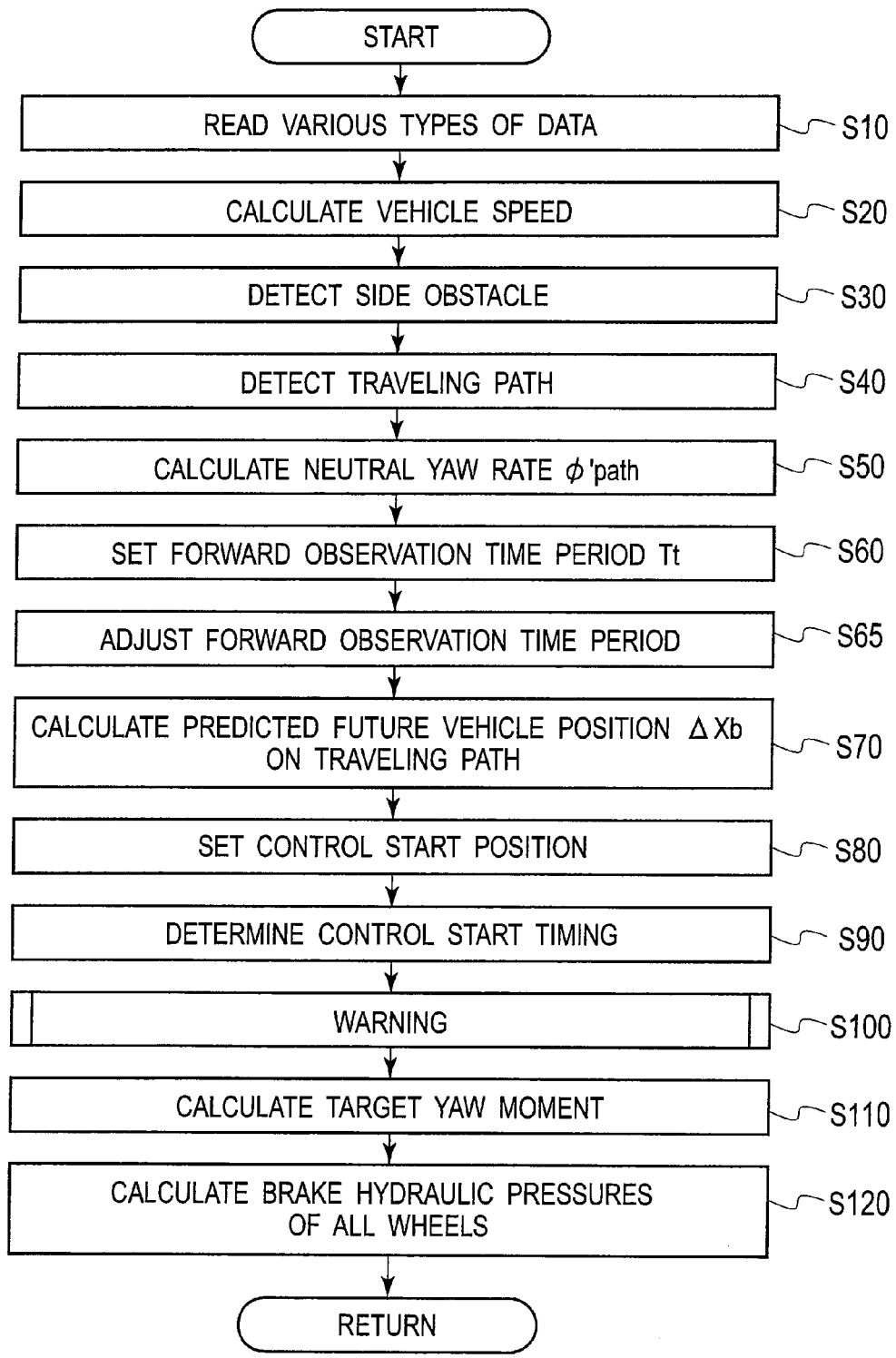
FIG. 14 is a flowchart showing a processing procedure of a braking/driving force control unit in a second embodiment of the invention.

FIG. 14 is a flowchart showing an obstacle avoidance control processing procedure executed by a braking/driving force control unit 8 in the second embodiment.

In the obstacle avoidance control processing, the same processes as those of the obstacle avoidance control processing of FIG. 3 are performed, except that a process of step S65 is added and that a process of step S80 is different from that of the obstacle avoidance control processing shown in FIG. 3. Accordingly, portions of the processing which are different are mainly described below.

<Step S65>

In step S65, the braking/driving force control unit 8 adjusts the forward observation time period Tt.

In step S65, when an obstacle avoidance control determination flag Fout_obst changes from ON to OFF, the forward observation time period Tt set in aforementioned step S60 is adjusted based on the following formula.

$$Tt \leftarrow Tt \cdot Kt \quad (24)$$

where Kt is a gain and $Kt \leqq 1$. As similar to the setting of the correction amount $\delta yc$ in the first embodiment described above, the gain Kt is set in accordance with a lane width of a vehicle traveling lane, a white line recognition certainty, an obstacle recognition certainty, and the like, in such a way that the more likely the vehicle position is to sway near a determination position used for the control start, the shorter the forward observation time period Tt is set.

Moreover, the gain Kt may be set such that the longer the time period elapsing after the obstacle avoidance control determination flag Fout_obst changes from ON to OFF is, the closer to "1" the gain Kt is set.

<Step S80>

In step S80, the braking/driving force control unit 8 sets a control start position 60 based on a predetermined obstacle distance X2obst (i.e. the reference obstacle distance X2obst_0 in the first embodiment). Note that, a lateral-direction relative distance $\Delta O$ between a vehicle MM and an obstacle SM may be used as the obstacle distance X2obst.

(Operation)

Next, an operation of the second embodiment is described.

It is assumed that a vehicle position (forward observation point 150) after the forward observation time period Tt currently returns to the lane inner-side direction of the control start position 60 after the start of the obstacle avoidance control. In this case, the obstacle avoidance control determination flag Fout_obst changes from ON to OFF.

First, the forward observation time period Tt is set which is used to calculate a predicted vehicle position $\Delta Xb$ being a distance between the current lateral position of the vehicle and the future lateral position (forward observation point 150) of the vehicle. Here, the forward observation time period Tt is a shorter time period than that in a normal state (step S65). Then, the predicted vehicle position $\Delta Xb$ is calculated as a distance between the current lateral position of the vehicle and the lateral position of the vehicle after the forward observation time period Tt, on the basis of a yaw angle $\phi_{front}$, a yaw angular velocity $\phi m$, and the like which are traveling states of the vehicle MM (step S70).

Then, the vehicle driving support control to avoid the obstacle is started when a lateral-direction distance $\Delta X2$ being a value obtained by subtracting a current lateral displacement X0 from the predicted vehicle position $\Delta Xb$ on a side where the obstacle (adjacent vehicle) SM is detected reaches or exceeds the predetermined obstacle distance X2obst (when the lateral position of the vehicle MM after the forward observation time period Tt, i.e. the forward observation point 150 is outside the control start position 60 in the lane width direction) (step S90). Here, since the forward observation time period Tt is adjusted to be shorter, the forward observation point 150 comes closer to the current position of the vehicle MM. Accordingly, the control start is suppressed (the frequency of the control start is reduced) compared to a period before the correction of the forward observation time period Tt.

Accordingly, even when the predicted vehicle position $\Delta Xb$ is unstable in a predetermined time period after the vehicle position after the forward observation time period Tt returns to the inside of the control start position 60 in the lane width direction, an unnecessary control is suppressed of intervening again and the feeling of strangeness given to the driver can be reduced.

Moreover, the reduction of the forward observation time period Tt causes the predicted vehicle position ΔXb to be smaller. Accordingly, when a target yaw moment Ms is calculated from aforementioned formula (16), a control amount (target yaw moment Ms) is small even if the control is started. This leads to suppression of change of a vehicle behavior when the control intervenes.

Meanwhile, when the target yaw moment Ms is calculated from aforementioned formula (17), the control amount increases even if the predicted vehicle position ΔXb decreases. Thus, a control which matches the situation regardless of the setting of the forward observation time period Tt and which gives no feeling of strangeness to the driver can be achieved.

Note that, step S65 of FIG. 14 corresponds to a start determination suppression part.

(Effect)

(11) A control suppression part 8Ba suppresses the determination of control start by reducing the setting time (forward observation time period Tt) used when a future position predictor 8A predicts the future vehicle position (predicted vehicle position ΔXb).

This allows the determination of control start to be suppressed in a relatively simple way.

Modified Examples (1) In each of the aforementioned embodiments 1 and 2, the descriptions are given of the case where the invention is applied to the obstacle avoidance control for avoiding contact between the vehicle MM and the side obstacle SM, as the vehicle driving support control. However, the invention is applicable also to a lane departure prevention control in which the vehicle MM is controlled using the lane as a target, regardless of the existence of the side obstacle SM. Specifically, the invention is applicable to a lane departure prevention control which prevents the vehicle MM from departing from the lane by applying a yaw moment thereto, regardless of the existence of the side obstacle SM, when the lateral position (forward observation point 150) of the vehicle position after the forward observation time period Tt reaches the control start position 60 or moves to the outside of the control start position 60 in the lane width direction.

In this case also, the departure from the lane can be appropriately prevented while the control start which gives the feeling of strangeness to the driver is suppressed.

(2) In each of the aforementioned embodiments 1 and 2, the descriptions are given of the case where the determination of control start/cancel is made based on the future position 150 of the vehicle MM after the predetermined time (forward observation time period Tt) (i.e. based on the predicted vehicle position ΔXb). However, the determination of control start/cancel can also be made simply based on the lateral position (lateral displacement X0) of the vehicle MM. In other words, the forward observation time period Tt may be set to zero.

(3) In each of the aforementioned embodiments 1 and 2, the descriptions are given of the case where the determination of control start is suppressed for the predetermined time period (certain time period) after the vehicle position returns to the control start position 60, as the control state hold time period. However, the determination of control start may be suppressed until the vehicle MM travels a predetermined distance (until a time required for the vehicle MM to travel the predetermined distance elapses), after the vehicle position returns to the control start position 60.

Furthermore, the determination of control start may be suppressed until the vehicle position reaches a suppression cancelation position for cancelling the suppression of the determination of control start (until a time required for the vehicle MM to reach the suppression cancelation position elapses), after the vehicle position returns to the control start position 60. The suppression cancelation position is set, for example, at the center of the vehicle traveling lane.

In other words, the control start simply needs to be suppressed for a predetermined period such as until the predetermined time period elapses, until the vehicle MM travels the predetermined distance, or until the vehicle position reaches the suppression cancelation position, after the vehicle position returns to the control start position 60.

(4) In each of the aforementioned embodiments 1 and 2, the period in which the control start is suppressed may be set in such a way that the more likely the vehicle position is to sway near the determination threshold for the control start, the longer the period is set. Thus, the vehicle driving support control with the feeling of strangeness further reduced can be performed.

(5) In each of the aforementioned embodiments 1 and 2, the determination threshold (or the forward observation time period Tt) such as the obstacle distance X2obst may gradually return to its normal value when the suppression of the determination of control start is cancelled. This allows smooth transition from the state where the determination of control start is suppressed to the normal control state.

(6) In each of the aforementioned embodiments 1 and 2, the start timing of the control is adjusted by adjusting the forward observation time period Tt or the determination threshold such as the obstacle distance X2obst. Instead, the start timing of the control may be delayed by multiplying an adjustment gain (<1) to the predicted vehicle position ΔXb calculated in step S70. In this case also, effects similar to those of the aforementioned embodiments 1 and 2 are obtained.

Moreover, the start timing of the control may be adjusted by multiplying the adjustment gain to the predicted vehicle position ΔXb in the condition used to determine the control start timing in step S90. In this case, even when the start timing of the control is adjusted by using the adjustment gain, the control amount (target yaw moment Ms) in the control operation is not affected by the adjustment gain.

The entire contents of Japanese Patent Application No. 2009-177422 (filing date in Japan: Jul. 30, 2009) and Japanese Patent Application No. 2010-133851 (filing date in Japan: Jun. 11, 2010) which are basic applications filed in Japan are incorporated herein, and are protected from erroneous translations and omissions.

The contents of the invention have been described by using the first and second embodiment and the modified examples thereof. However, it is obvious to those skilled in the art that the invention is not limited to these descriptions and various modifications and improvements can be made thereto.

INDUSTRIAL APPLICABILITY

In the invention, when the lateral position of the vehicle (MM) in the lane width direction moves to the inside of the control start position (60) after the determination of control start is made, the control is suppressed for the predetermined period after the lateral position moves to the inside. Accordingly, even when the lateral position of the vehicle (MM) in the lane width direction is unstable, the control can be suppressed. As a result, the feeling of strangeness given to the driver can be reduced.

The invention claimed is:

1. A vehicle driving support device, comprising:
a control start determination part configured to determine to start a control when a lateral position of a vehicle in a lane width direction reaches a control start position being a predetermined lateral position in the lane width direction;
a vehicle controller configured to control the vehicle by applying a yaw moment toward the center of a vehicle traveling lane to the vehicle when the control start determination part makes the determination of control start; and
a control suppression part configure to, when the lateral position of the vehicle in the lane width direction moves from a position outside the control start position in the lane width direction to a position approaching the vehicle traveling lane inside the control start position in the lane width direction, suppress the control of applying the yaw moment to the vehicle for a predetermined period after the lateral position of the vehicle in the lane width direction moves to the position approaching the vehicle traveling lane, compared to a period before the movement to the position approaching the vehicle traveling lane.

2. The vehicle driving support device according to claim 1, further comprising a future position prediction part configured to predict a future position of the vehicle after a setting time period from a current time,
wherein the lateral position of the vehicle in the lane width direction is the future position predicted by the future position prediction part.

3. The vehicle driving support device according to claim 2, wherein the control suppression part suppresses the control by reducing the setting time period used in the prediction of the future position of the vehicle by the future position prediction part.

4. The vehicle driving support device according to claim 1, wherein the control suppression part suppresses the control by changing the control start position to a position farther away from the vehicle traveling lane in the lane width direction when the lateral position of the vehicle in the lane width direction moves from the position outside the control start position to the position approaching the vehicle traveling lane inside the control start position in the lane width direction.

5. The vehicle driving support device according to claim 1, further comprising a lane width detector configured to detect a lane width of the vehicle traveling lane,
wherein the control suppression part suppresses control more as the lane width of the vehicle traveling lane detected by the lane width detector becomes narrower.

6. The vehicle driving support device according to claim 1, further comprising an obstacle distance detector configured to detect a distance between the vehicle and an obstacle existing on a side to which the vehicle is to laterally move by the control of the vehicle controller,
wherein the control suppression part suppresses the control more as the distance between the vehicle and the obstacle detected by the obstacle distance detector becomes shorter.

7. The vehicle driving support device according to claim 1, further comprising a vehicle posture detector configured to detect a stableness of a vehicle posture of the vehicle,
wherein the control suppression part suppresses the control more as the stableness of the vehicle posture of the vehicle detected by the vehicle posture detector becomes lower.

8. The vehicle driving support device according to claim 1, further comprising a lane dividing line detector configured to detect a lane dividing line of the vehicle traveling lane,
wherein the lane dividing line detector determines a recognition certainty of the lane dividing line when detecting the lane dividing line,
the control start position is set at a position away from a position of the lane dividing line detected by the lane dividing line detector by a predetermined distance in the lane width direction, and
the control suppression part suppresses the control more as the recognition certainty of the lane dividing line determined by the lane dividing line detector becomes lower.

9. The vehicle driving support device according to claim 1, further comprising a side obstacle detector configured to detect a side obstacle on a lateral side of the vehicle,
wherein the control start determination part determines to start the control when the lateral position of the vehicle in the lane width direction reaches the control start position in a state where the side obstacle is detected by the side obstacle detector.

10. The vehicle driving support device according to claim 9, wherein
the side obstacle detector determines a recognition certainty of the side obstacle when detecting the side obstacle,
the control start position is set based on a distance between the vehicle and the side obstacle detected by the side obstacle detector in the lane width direction, and
the control suppression unit suppresses the control more as the recognition certainty of the side obstacle determined by the side obstacle detector becomes lower.

11. A vehicle driving support method, comprising:
a control start determination step of determining to start a control when a lateral position of a vehicle in a lane width direction reaches a control start position being a predetermined lateral position in the lane width direction;
a vehicle control step of controlling the vehicle by applying a yaw moment toward the center of a vehicle traveling lane to the vehicle; and
a control suppression step of, when the lateral position of the vehicle in the lane width direction moves from a position outside the control start position in the lane width direction to a position approaching the vehicle traveling lane inside the control start position in the lane width direction, suppressing the control of applying the yaw moment to the vehicle for a predetermined period after the lateral position of the vehicle in the lane width direction moves to the position approaching the vehicle traveling lane, compared to a period before the movement to the position approaching the vehicle traveling lane.

* * * * *